United States Patent [19]
Ansari et al.

[11] Patent Number: 6,052,361
[45] Date of Patent: Apr. 18, 2000

[54] METHOD FOR PROVIDING A FAIR-RATE ALLOCATION FOR AVAILABLE BIT RATE SERVICES

[75] Inventors: Nirwan Ansari, Cedar Grove; Ambalavanar Arulambalam, Edison; Xiaoqiang Chen, Eatontown, all of N.J.

[73] Assignee: Lucent Technologies Inc., Murray Hill, N.J.

[21] Appl. No.: 08/840,778

[22] Filed: Apr. 16, 1997

[51] Int. Cl.[7] .............................. H04L 12/26; H04L 12/56
[52] U.S. Cl. ............................................ 370/232; 370/235
[58] Field of Search .................................. 370/412, 236, 370/232, 235, 231, 229

[56] References Cited

U.S. PATENT DOCUMENTS

| | | | |
|---|---|---|---|
| 5,675,576 | 10/1997 | Kalampoukas et al. | 370/232 |
| 5,701,292 | 12/1997 | Chiussi et al. | 370/232 |
| 5,737,313 | 4/1998 | Kalakov et al. | 370/234 |
| 5,777,984 | 7/1998 | Gun et al. | 370/230 |
| 5,812,527 | 9/1998 | Kline et al. | 370/232 |
| 5,889,761 | 3/1999 | Yamato | 370/231 |

*Primary Examiner*—Hassan Kizou
*Assistant Examiner*—Ahmed Elallam

[57] ABSTRACT

A method for allocating a fair bit rate for an ABR service. Forward and backward RM cells traversing a link 1 are received at an ATM switch. Both the forward and backward RM cells are associated with a session, with the forward RM cells being transmitted from a source to a destination and the backward RM cells being transmitted from the destination to the source. An advertised rate $\gamma_l$ for link 1 is updated when a backward RM cell associated the session is received based on a change in a bottleneck bandwidth $\Delta\lambda$ of the session and a change in a bottleneck status $\Delta\beta$ of the session. The explicit rate $\lambda^{ER}$ contained in the backward RM cell is rewritten as a minimum of the advertised rate $\gamma_l$ and the explicit rate $\lambda^{ER}$. The backward RM cell is then transmitted to the source of the RM cell.

6 Claims, 18 Drawing Sheets

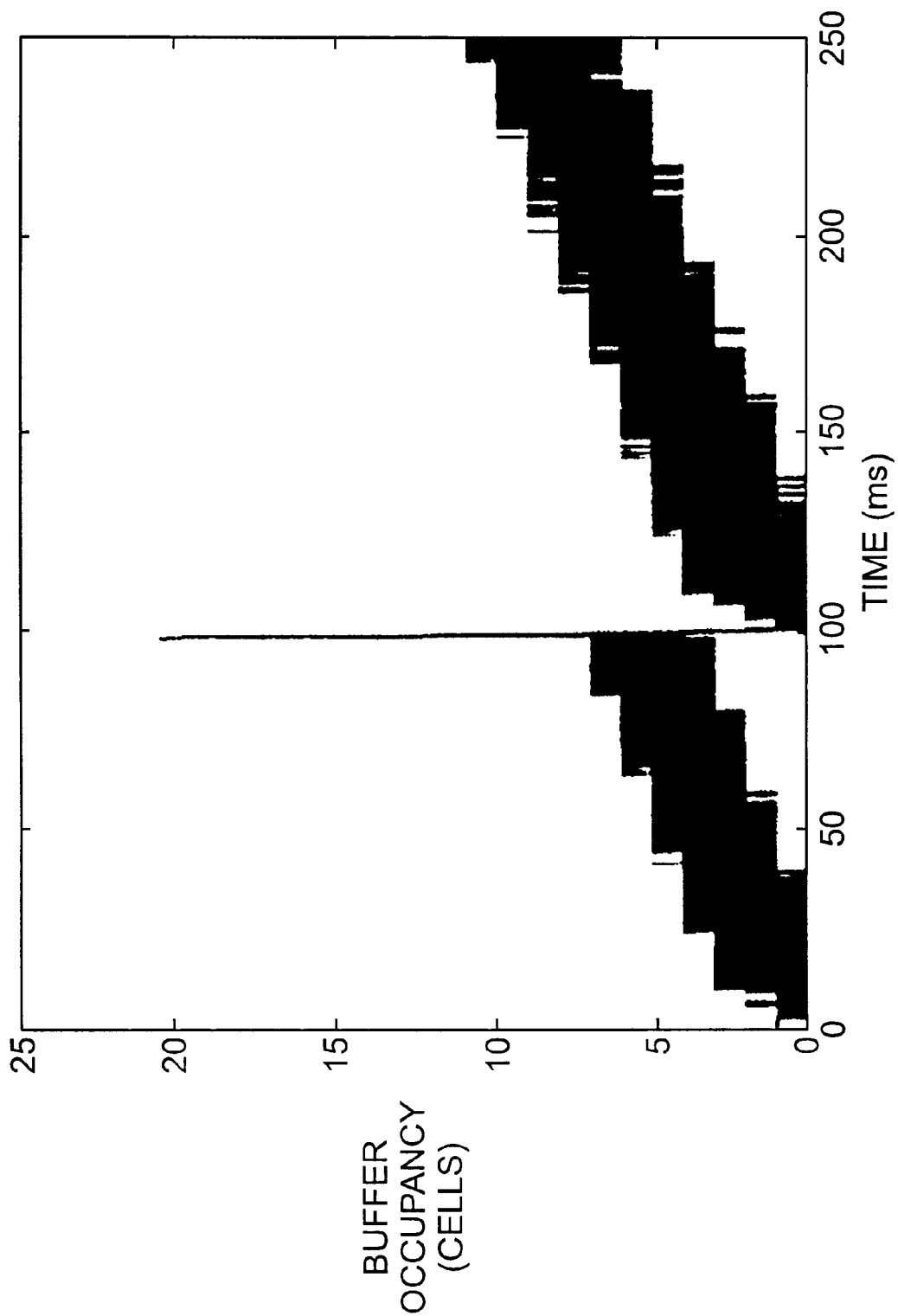

METHOD FOR PROVIDING A FAIR-RATE ALLOCATION FOR AVAILABLE BIT RATE SERVICES

BACKGROUND OF THE INVENTION

1. Field of the Invention

The present invention relates to the field of telecommunications. More particularly, the present invention relates to a method for fairly allocating link bandwidth for Available Bit Rate (ABR) service in Asynchronous Transfer Mode (ATM) networks.

2. Description of the Related Art

The emergence of ATM (Asynchronous Transfer Mode) technology in communication networks is an imminent avenue for various multimedia applications. As an established principle, ATM provides flexibility for integrating transport of different classes of traffic, with different classes having a wide ranges of service requirements. Most data applications cannot predict their own traffic parameters and, accordingly, usually require a service that dynamically shares available bandwidth with other data applications. Such a service is referred to as an Available Bit Rate (ABR) service. Requirements for an ABR service are disclosed by The ATM Forum, "The ATM Forum Traffic Management Specification, Version 4.0," ATM Forum Contribution, 1995, incorporated by reference herein.

Because of the bursty nature of ATM communications, ABR service congestion control poses many challenging problems and is the focus of recent standardization efforts of the ATM Forum. The ATM Forum has adopted a rate-based congestion control approach without making commitments to any particular switch algorithm. The rate-based approach provides architectural flexibility with a wide range of possible switch implementations covering varying degrees of cost and complexity. The network switch is responsible for allocating a fair share of the available bandwidth among all competing connections at this switch point. This is accomplished by implementing a fair rate allocation scheme.

Some key issues that a rate allocation scheme must address are fairness, efficiency, responsiveness, robustness, scalability, stability, complexity and inter-operability. Regarding fairness, some type of a fairness criteria should be guaranteed for all connections, especially for a start-up VC connection which has difficulty obtaining bandwidth from existing VC connections. A scheme should be efficient by producing high effective throughput, high link utilization and low buffer usage, and should respond and adapt rapidly to changes in available bandwidth. Bit rates should converge to the max-min fair allocations quickly when new connections are formed or old connections exit. The scheme should be robust so that any loss or mis-tuning of parameters does not cause the network to fail. The scheme should scale well with the number of connections in the network, time. length of connections, propagation delays in the network, etc. At steady-state, the scheme should be stable by maintaining rates and does not cause large oscillations leading to an unstable network. The scheme should be simple to implement without adding significant cost to switch design. Required computations should be kept to a minimum. Lastly, the switches on which the scheme is provided should be able to operate effectively with existing simpler switches.

A primary goal of an ABR service is to utilize the network resources to their fullest extent while maintaining some notion of fairness among competing ABR connections. The ATM Forum has accepted the notion of max-min fairness, as disclosed by J. M. Jaffe, "Bottleneck Flow Control," IEEE Transactions on Communications, vol. 29, pp. 954–962, July 1981, and incorporated by reference herein, as the criterion for deciding fairness among ABR service users in an ATM network. The max-min fairness criterion provides the maximum possible bandwidth to the source receiving the least bandwidth among all contending sources.

To formulate the problem of fairness as it relates to an ABR service, let L define the set of links and S define the set of virtual connections established in a given ATM network. Each session j∈S has a fixed path and traverses a subset of links $L_j$. Let $S_l$ denote the set of sessions that traverse link 1∈L. The capacity (or bandwidth) of each link 1∈L is denoted by $C_l$. Let $\lambda_j^{CCR}$ denote the allocated rate at which the cells of session j enters the network (i.e., current cell rate), and let $\lambda_j^{ER}$ denote the maximum permitted transmission rate of session j (i.e., explicit rate).

Let $\lambda_j$ be the allocated rate for session j. The flow on link 1, $F_l$ is defined as:

$$F_l = \sum_{j \in S_l} \lambda_j. \qquad (1)$$

A link 1∈L is defined to be the "bottleneck link" for a session j, if $F_l = C_l$, and $\lambda_j$ is at least as large as the rate of any other sessions using the bottleneck link. The rate, $\lambda_j$, is referred to as the bottleneck bandwidth for the session j.

The ABR max-min principle is fair since all sessions sharing a link receive an equal share of bandwidth of the link provided that each session can use the fair share, and the only factor preventing a source from obtaining a higher allocation is a bottleneck link. Moreover, the max-min principle is efficient in the sense that it maximizes the throughput.

Congestion control for an ABR service is based on a per-connection control using feedback information from a network for controlling the rate at which a source transmits cells for each virtual connection (VC). The basic element of the control is to provide a proportional rate adjustment, where any increase or decrease in a source rate is proportional to the current rate of the source. Communication of congestion and rate allocation information is done via special control cells called Resource Management (RM) cells. The basic option offered by ATM switches consists of a single-bit binary feedback, supported by EFCI (Explicit Forward Congestion Indication) mechanisms provided in the switches, and a Congestion Indication (CI) bit and a No Increase (NI) bit contained in the RM cells.

A flexibility of the rate-based congestion control approach is a calculation of explicit cell transmission rates for ABR service users by switches. Since many ABR service users compete for bandwidth, the available bandwidth must be shared fairly among all ABR service users. To achieve "fairness", each switch in an ATM network executes a rate allocation algorithm. The challenge is to calculate the explicit rate, which is a fair share of available bandwidth for an ABR service user, in a distributed and asynchronous way.

Binary schemes, however, result in unfairness (i.e., the beat-down problem), and a slow response. To overcome these problems, switches may employ, in addition to binary schemes, sophisticated mechanisms that compute an Explicit Rate (ER) value that is fed back in the ER field of an RM cell. For example, see L. Roberts, "Enhanced PRCA (Proportional Rate-Control Algorithm)," The ATM Forum Contribution No. 94-0735R1, August 1994; R. Jain et al., "The OSU Scheme for Congestion Avoidance using Explicit Rate Indication," tech. rep., Ohio State University, September 1994; A. Charny et al., "Congestion Control with Explicit Rate Indication," Proc. ICC 95, June 1995, which is incorporated by reference herein; and K. Siu et al., "Adaptive Proportional Rate Control for ABR Service in ATM Networks," Tech. Rep. 94-07-01, Electrical and Computer Engineering, University of California, Irvine, July 1994, each of which is incorporated by reference herein. The more advanced approaches require switches that compute the fair share for each connection and explicitly set the source transmission rate.

The ATM Forum defined standards for behavior of a source, a destination and switch are set forth in The ATM Forum, "The ATM Forum Traffic Management Specification, Version 4.0," ATM Forum Contribution, 1995. The general end-to-end control mechanism is depicted in FIG. 1. In FIG. 1, a source 10 transmits data cells 11 in a forward direction through ATM switches 12 to a destination 13. Once a connection has been set up between source 10 and destination 13 and source 10 has received permission to transmit, source 10 sends data cells 11 at an Initial Cell Rate (ICR). For each connection, the source end system 10 generates one forward RM 14 cell for every $N_{RM}$ data cell. Upon generation of an RM cell, source 10 sets its current Allowed Cell Rate (ACR) on one of the RM cell fields called the Current Cell Rate (CCR). Additionally, the ER field of the RM cell is set to the Peak Cell Rate (PCR) of the connection. When an RM cell is received at a switch 12, the switch processes the congestion information, and marks the appropriate RM cell fields based on the switch behavior. When the RM 14 cell reaches the destination end system 13, the RM cell is returned to source 10 by destination end system 13, creating a backward flow of RM cells to close the feedback loop. Once source 10 receives an RM cell, the ACR value is adjusted. If the congestion bit CI=0 (indicating no congestion), and the No Increase bit NI=0 (indicating increase enabled), the ACR is adjusted as follows:

$$ACR = \max(\min(PCR, ER, ACR+RIF*PCR), MCR). \qquad (2)$$

If CI=1 (congestion), the ACR value is adjusted as follows:

$$ACR = \max\left\{\min\left(PCR, ER, ACR - \frac{ACR}{RDF}\right), MCR\right\}, \qquad (3)$$

where RIF is the Rate Increase Factor, RDF is the Rate Decrease Factor, and MCR is the Minimum Cell Rate. Note that the factors RIF and RDF control the rate at which the source increases and decreases its rate, respectively. A good overview of the rate-based scheme is disclosed by F. Bonomi et al., "The Rate-Based Flow Control Framework for the Available Bit Rate ATM Service," IEEE Networks Magazine, pp. 25–39, March–April 1995, which is incorporated by reference herein.

What is needed is an ABR congestion control scheme that provides a fair, fast adaptive rate allocation algorithm designed for ATM switches implementing explicit rate congestion control supporting an ABR service. Further, it is desired that the ABR congestion control scheme provide computational simplicity, fast convergence, oscillation free steady state, high link utilization and low buffer requirements. Further still, the desired ABR congestion control scheme must be robust in the sense that any loss of RM cells does not affect the functionality, or stability of the congestion control scheme.

SUMMARY OF THE INVENTION

The present invention provides an ABR congestion control scheme that is a fair, fast adaptive rate allocation algorithm designed for ATM switches implementing explicit rate congestion control supporting an ABR service. Additionally, the present invention provides an ABR congestion control scheme having computational simplicity, fast convergence, oscillation free steady state, high link utilization and low buffer requirements. The present invention is robust in the sense that any loss of RM cells does not affect the functionality, or stability of the congestion control scheme. Furthermore, the present invention does not require any parameter tuning as the size of the network grows. Consequently, there is no need for reconfiguring parameter values or concern about any incorrect settings of various parameters.

The advantages of the present invention are provided by a method for allocating a fair bit rate for an ABR service. According to the invention, forward and backward RM cells traversing a link 1 are received at an ATM switch. Both the forward and backward RM cells are associated with a session, with the forward RM cells being transmitted from a source to a destination and the backward RM cells being transmitted from the destination to the source. An advertised rate $\gamma_l$ for link 1 is updated when a backward RM cell associated with the session is received based on a change in a bottleneck bandwidth $\Delta\lambda$ of the session and a change in a bottleneck status $\Delta\beta$ of the session. The explicit rate $\lambda^{ER}$ contained in the backward RM cell is rewritten as a minimum of the advertised rate $\gamma_l$ and the explicit rate $\lambda^{ER}$. The backward RM cell is then transmitted to the source of the RM cell.

Preferably, the step of updating the advertised rate $\gamma_l$ includes comparing an explicit rate $\lambda^{ER}$ contained in the backward RM cell to the advertised rate $\gamma_l$. When the explicit rate $\lambda^{ER}$ is less than the advertised rate $\gamma_l$, a bottleneck indicator $\beta$ and a bottleneck bandwidth $\lambda$ for the session are set. When the explicit rate $\lambda^{ER}$ is greater than or equal to the advertised rate $\gamma_l$, the bottleneck indicator $\beta$ and the bottleneck bandwidth $\lambda$ for the session are cleared. Then, a number of bottlenecked connections $\overline{N}_l(t^+)$ for the link after the backward RM cell is received and a bottlenecked bandwidth for bottlenecked connections $\overline{C}_l(t^+)$ for the link after the backward RM cell is received are calculated. Lastly, the advertised rate $\gamma_l$ is updated based on a quantity difference between an available bandwidth $C_l^A(t)$ prior to receiving the backward RM cell and the bottlenecked bandwidth for bottlenecked connections $\overline{C}_l(t^+)$ after the backward RM cell is received, divided by a quantity difference between a number of bottlenecked connections $\overline{N}_l(t)$ prior to receiving the backward RM cell and the number of bottlenecked connections $\overline{N}_l(t^+)$ after the backward RM cell is received. The available bandwidth $C_l^A(t)$ for link 1 is based on a difference between a link capacity bandwidth $C_l$ for link 1 and a bandwidth for guaranteed traffic $C_l^{GUR}$ for link 1 and scaled by a bandwidth utilization factor $\mu_l$ for link 1. A load factor for link 1 is computed based on an actual ABR traffic bandwidth $F_l$ for link 1 divided by the available bandwidth $C_l^A(t)$ for link 1. The explicit rate $\lambda^{ER}$ of non-bottlenecked sessions for link 1 is then increased based on the load factor $\rho_l$.

BRIEF DESCRIPTION OF THE DRAWINGS

The present invention is illustrated by way of example and not limitation in the accompanying figures in which like reference numerals indicate similar elements and in which:

FIG. 5(c) shows instantaneous queue length for a single-hop LAN configuration (RIF=0.1) for the FMMRA scheme of the present invention having no buffer control;

DETAILED DESCRIPTION

Figure 1:
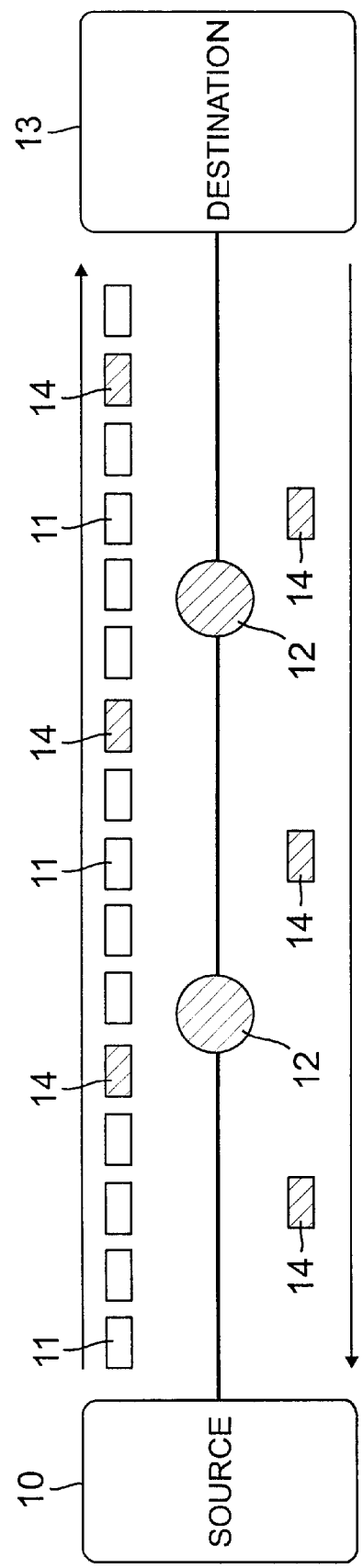
FIG. 1 is a block diagram of an exemplary network for showing a general end-to-end ABR service congestion control scheme.

The ABR congestion control scheme of the present invention can be used by any switch component experiencing congestion, such as an input port, an output port, etc. A key idea underlying the present invention, also referred to as the Fast Max-Min Rate Allocation (FMMRA) algorithm, is that each ABR queue in a switch computes a rate that the queue can support. This rate is referred to as the advertised rate $\gamma_l$, where subscript 1 refers to the particular link that the queue serves. According to the present invention, the ER field contained in an RM cell is read and marked in both directions, thus increasing the rate allocation process. If a particular session cannot use the advertised rate for the $\gamma_l$ link, the session is marked as being bottlenecked elsewhere, and its bottleneck bandwidth is recorded in a table for the link. The advertised rate $\gamma_l$ is then recomputed using an updating rule that incorporates the bottleneck status of all sessions using the link. In addition to using an updating rule, the present invention includes an ABR Connection Management module, an Available Bandwidth Management module, an Explicit Rate Calculation module, and a Congestion Detection and Buffer Management module for facilitating fair rate calculations.

As an overview of the ABR congestion control scheme of the present invention, max-min fairness is provided by first maximizing the link capacity that is allocated to sessions of a link having the minimum allocation. The remaining link capacity is then used in such a way that the link capacity allocated to the most poorly treated session among the remaining sessions of the link is maximized. In other words, to determine the fair allocation rates for non-bottlenecked sessions, the rates of the bottleneck connections are considered to be fixed and a reduced network is formed by eliminating the bottlenecked connections and their respective rates from consideration. The capacity for all the links (excluding bottleneck links) is reduced-by the total bottleneck bandwidth elsewhere. The procedure is repeated using an iteratively reduced network until all sessions have received fair allocation rates. The bottleneck status of each session of a link is maintained and the updating rule for the advertised rate $\gamma_l$ is:

where $C_l^A$ is the available bandwidth for ABR traffic, $\overline{C}_l$ is the sum of the bandwidth of $$\gamma_l = \frac{C_l^A - \overline{C}_l}{N_l - \overline{N}_l}, \quad (4)$$

connections bottlenecked elsewhere, $N_l$ is the total number of sessions that traverse link 1, and $\overline{N}_l$ is the total number of bottlenecked connections elsewhere. The available bandwidth for ABR traffic $C_l^A$ and the sum of the bandwidth of connections bottlenecked elsewhere $\overline{C}_l$ is generated by the Available Bandwidth Management module. The total number of sessions that traverse link 1 $N_l$ and the total number of bottlenecked connections elsewhere $\overline{N}_l$ are generated by the ABR Connection Management module.

The advertised rate $\gamma_l$ is updated each time a backward RM cell is received at the queue. For example, let time t be the time when a backward RM cell is received at a queue, and let $t^+$ be the time the advertised rate is updated based on information from the recently received backward RM cell. Similarly, let $\gamma_l(t)$ be the advertised rate at time t, and let $\gamma_l(t^+)$ be the updated advertised rate resulting at time $t^+$. Incorporating these time indices into Equation (4) results in $$\gamma_l(t^+) = \frac{C_l^A(t) - \overline{C}_l(t^+)}{N_l(t) - \overline{N}_l(t^+)}. \quad (5)$$

In Equation (5), $C_l^A(t)$ is the bandwidth available for ABR traffic at time t, $\overline{C}_l(t^+)$ is the sum of the total bottleneck bandwidth $\overline{C}_l(t)$ prior to the update plus any change in the bottleneck bandwidth of the session $\Delta\lambda$ occurring at the time of update. That is, $\overline{C}_l(t^+)=\overline{C}_l(t)+\Delta\lambda$. Similarly, $\overline{N}_l(t^+)=\overline{N}_l(t)+\Delta\beta$, where $\overline{N}_l(t)$ is the number of bottlenecked sessions of the link prior to the update, and $\Delta\beta$ represents a change in bottleneck status of a session at the time of the update.

The bottleneck bandwidth $\Delta\lambda$ and bottleneck status $\Delta\beta$ of a session are determined by comparing the ER field in the RM cell with the advertised rate of the link.

The Explicit Rate Calculation module uses $\beta_l^i$ as an indicator for deciding whether a session i is bottlenecked elsewhere, and $\lambda_l^i$ is used for the corresponding bottleneck bandwidth for session i. Based on the explicit rate value $\lambda_i^{ER}$ contained in a received RM cell, the variables $\Delta\lambda$ and $\Delta\beta$ are determined by the Explicit Rate Calculation module as:

$$\Delta\lambda = \begin{cases} \lambda_i^{ER} - \lambda_l^i \beta_l^i & \text{if } \lambda_i^{ER} < \gamma_l, \\ 0 - \lambda_l^i \beta_l^i & \text{if } \lambda_i^{ER} \geq \gamma_l. \end{cases} \quad (6)$$

$$\Delta\beta = \begin{cases} 1 - \beta_l^i & \text{if } \lambda_i^{ER} < \gamma_l, \\ 0 - \beta_l^i & \text{if } \lambda_i^{ER} \geq \gamma_l. \end{cases} \quad (7)$$

Equation (5) becomes $$\gamma_l(t^+) = \frac{C_l^A(t) - \overline{C}_l(t) - \Delta\lambda}{N_l(t) - \overline{N}_l(t) - \Delta\beta}. \quad (8)$$

Equation (8) can be rewritten as $$\gamma_l(t^+) = \frac{C_l^A(t) - \overline{C}_l(t)}{N_l(t) - \overline{N}_l(t)} + \frac{\frac{C_l^A(t) - \overline{C}_l(t)}{N_l(t) - \overline{N}_l(t)}\Delta\beta - \Delta\lambda}{N_l(t) - \overline{N}_l(t) - \Delta\beta}. \quad (9)$$

Note that in Equation (9), the term $$\frac{C_l^A(t) - \overline{C}_l(t)}{N_l(t) - \overline{N}_l(t)} = \gamma_l(t), \quad (10)$$

where $\gamma_l(t)$ is the advertised rate just before the update. The updated advertised rate $\gamma_l(t^+)$ can be expressed in terms of the old advertised rate $\gamma_l(t)$ as:

$$\gamma_l(t^+) = \gamma_l(t) + \frac{\gamma_l(t)\Delta\beta - \Delta\lambda}{N_l(t) - [\overline{N}_l(t) + \Delta\beta]}. \quad (11)$$

The ABR Connection Management module utilizes a VC table for each queue having two variables per virtual connection for maintaining status for each session. The one bit variable $\beta_l^i$ is used for deciding whether a session i is bottlenecked elsewhere and, if so, the corresponding bottleneck bandwidth is recorded in variable $\lambda_l^i$. These variables are referred to and updated upon arrival of RM cells.

In addition to a VC table, the ABR Connection Management module maintains variables for each queue, such as the total number of ABR connections using the queue $N_l$, the advertised rate $\gamma_l$, the total number of ABR connections bottlenecked elsewhere $\overline{N}_l$, and bandwidth information generated by the bandwidth management module. When a connection is opened or closed, the number of ABR connections $N_l$ is updated as:

$$N_l(t^+) = \begin{cases} N_l(t) + 1 & \text{if a new VC opens at link } l \text{ at time } t, \\ N_l(t) - 1 & \text{if an existing VC closes at link } l \text{ at time } t, \end{cases} \quad (12)$$

where $N_l(t^+)$ is the updated total number of ABR connections using the queue after a connection is opened or closed, $N_l(t)$ is the total number of ABR connections using the queue at the time a connection is opened or closed, $t^+$ is the time an update has occurred, and t is the time that the connection is opened or closed.

At the time when a connection opens, the per-VC variables for the connection are initialized to zero, and the advertised rate $\gamma_l$ for the link in which the connection has been opened is then updated as:

$$\gamma_l(t^+) = \gamma_l(t) - \frac{\gamma_l(t)}{N_l(t) - \overline{N}_l(t^+)}, \quad (13)$$

where $\gamma_l(t^+)$ is the updated advertised rate at time $t^+$, $\gamma_l(t)$ is the advertised rate at time t, and $\overline{N}_l(t^+)$ is the total number of ABR connections using the queue for link 1 at time $t^+$ that are bottlenecked elsewhere.

When a connection closes, the information regarding the closed VC is erased, and the status of the link is adjusted accordingly. For example, let j be a connection that is closed. $\overline{N}_l$ and $\gamma_l$ are updated as:

$$\overline{N}_l(t^+) = \overline{N}_l(t) - \beta_l^j, \quad (14)$$

$$\gamma_l(t^+) = \gamma_l(t) + \frac{\lambda_l^j + \gamma_l(t)\beta_l^j}{N_l(t) - \overline{N}_l(t)}, \quad (15)$$

where $\overline{N}_l(t^+)$ is the total number of ABR connections using the queue for link 1 at time $t^+$ that are bottlenecked elsewhere, $\overline{N}_l(t)$ is the total number of ABR connections using the queue for link 1 at time t that are bottlenecked elsewhere, $\beta_l^j$ is an indicator used for deciding whether session j is bottlenecked elsewhere, $\gamma_l(t^+)$ is the updated advertised rate at time $t^+$, and $\gamma_l(t)$ is the advertised rate at time t.

The Available Bandwidth Management module determines the available bandwidth for ABR traffic $C_l^A(t)$ as the difference between the link capacity $C_l$ and the bandwidth used for any guaranteed traffic $C_l^{GUR}(t)$. The ABR traffic bandwidth is computed as:

$$C_l^A(t) = \mu_l(C_l(t) - C_l^{GUR}(t)), \quad (16)$$

where $\mu_l$ represents a desired bandwidth utilization factor for ABR traffic on link 1. When $\mu_l$ is set to 1, a high link utilization is ensured. When $\mu_l$ is set to be slightly below 1, the link operates on a congestion avoidance basis, sacrificing high link utilization. In a Local Area Network (LAN), it is possible to set $\mu_l$ to be close to 1 because small propagation delays are experienced in the LAN. Consequently, the control action of the present invention takes place quickly in situations of link overflows.

At each bandwidth update, the advertised rate is adjusted to reflect the change in available bandwidth, with any guaranteed traffic $C_l^{GUR}(t)$ accounted for, as:

$$\gamma_l(t^+) = \gamma_l(t) + \frac{C_l^A(t^+) - C_l^A(t)}{N_l(t) - \overline{N}_l(t)}. \quad (17)$$

In addition to the ABR traffic bandwidth estimation, a load factor $\rho_l(t)$ is computed as the ratio of actual ABR traffic bandwidth $F_l(t)$ to the bandwidth available for ABR traffic. The actual ABR traffic bandwidth $F_l(t)$ is equivalent to the sum of current cell rates of all the ABR VCs for link 1, that is, the total flow on link 1. The load factor is computed as:

$$\rho_l(t) = \frac{F_l(t)}{C_l^A(t)}. \tag{18}$$

The load factor is used for distributing the bandwidth not used by idle sessions to active sessions. The bandwidth can be estimated by each queue measuring the incoming cell rate over a fixed "averaging interval."

The standards for a rate-based approach specify that a switch should not increase the value contained in the ER field, but can reduce the value of the ER field to a lower value. This requirement is achieved by the Explicit Rate Calculation module by comparing the value of the ER field in the RM cell with the advertised rate, and rewriting the ER field as:

$$\lambda_i^{ER}(t) \leftarrow \min(\gamma_l(t), \lambda_i^{ER}(t)). \tag{19}$$

This assignment by the Explicit Rate Calculation module is done whenever an RM cell is received at the switch, regardless of the direction of the RM cell. Downstream switches learn the bottleneck status of each virtual connection whenever a forward RM cell is marked by an upstream switch, and upstream switches learn the bottleneck status of a virtual connection whenever a backward RM cell is marked by a downstream switch. The bidirectional updating of the ER field in an RM cell plays a significant role in drastically reducing convergence time of the max-min fair rate allocation process. The advertised rate at a queue is updated only when a backward RM cell is received, since this RM cell has been seen by all switches along the path of the RM cell and, consequently, the fields of the backward RM cell contain the most complete information about the status of the network.

At reception of a backward RM cell, the change of status of a connection is determined by calculating a change in per-VC variables, $\Delta\lambda$ and $\Delta\beta$, using Equations (6) and (7). The updated advertised rate is calculated as:

$$\gamma_l(t^+) = \begin{cases} C_l^A(t) & \text{if } N_l(t) = 0, \\ \gamma_l(t) + \dfrac{\gamma_l(t)\Delta\beta - \Delta\lambda}{N_l(t) - [\overline{N}_l(t) + \Delta\beta]} & \text{if } N_l(t) > \overline{N}_l(t), \\ \gamma_l(t) & \text{if } N_l(t) = \overline{N}_l(t). \end{cases} \tag{20}$$

In contrast to, for example, the algorithm presented by A. Charny et al., "Congestion Control with Explicit Rate Indication," Proc. ICC 95, June 1995, incorporated by reference herein, which requires that the switch inspect all sessions and calculate a fair rate, the present invention requires only the knowledge of the session for a received backward RM cell that is seen by a switch at the time of update. Thus, the computational complexity of the present invention is O(1), whereas the Charny et al. algorithm has a computational complexity of $O(N_l)$.

Next, the updated number of bottlenecked connections at the queue is determined as:

$$\overline{N}(t^+) = \begin{cases} \overline{N}_l(t) + 1 - \beta_l^i & \text{if } \lambda_i^{ER} < \gamma_l, \\ \overline{N}_l(t) - \beta_l^i & \text{if } \lambda_i^{ER} \geq \gamma_l. \end{cases} \tag{21}$$

Finally, once the explicit rate $\lambda^{ER}$ is marked on any backward RM cell and the port variables are updated, the switch updates the corresponding per-VC variables in the VC table as:

$$\beta_l^i = \begin{cases} 1 & \text{if } \lambda_i^{ER} < \gamma_l, \\ 0 & \text{if } \lambda_i^{ER} \geq \gamma_l. \end{cases} \tag{22}$$

$$\lambda_l^i = \begin{cases} \lambda_i^{ER} & \text{if } \lambda_i^{ER} < \gamma_l, \\ 0 & \text{if } \lambda_i^{ER} \geq \gamma_l. \end{cases} \tag{23}$$

It is essential to note that the fair rate assignment as in Equation (19) is conservative since if any session is idle, the link will not be fully utilized. Moreover, it should be noted that there are no mechanisms specified thus far for the present invention for controlling queue growth. Nevertheless, the present invention provides both a basic scheme having no buffer control, and a scheme having buffer control. The basic scheme is referred to as the FMMRA algorithm having no buffer control. The algorithm of the present invention having buffer control is referred to as the FMMRA algorithm.

The FMMRA algorithm of the present invention uses a Congestion Detection and Buffer Management module that utilizes the CCR field of an RM cell, the bottleneck status of a session, the load factor $\rho_l$ for a link 1, and queue length. As previously described, the load factor $\rho_l$ is computed every time the ABR traffic bandwidth is estimated. The load factor $\rho_l$ reflects how well the ABR bandwidth is utilized. For example, $\rho_l$<1 reflects that some sessions are sending cells at a rate that is less than their allowed rate. Such a situation presents an opportunity for non-bottlenecked sessions in link 1 to increase their rate. In view of this, the updated explicit rate assignment operation is formulated by modifying Equation (19) to be:

$$\lambda_i^{ER}(t^+) \leftarrow \min\left\{\max\left(\frac{\hat{\lambda}_l^i(1-\beta_l^i)}{\rho_l}, \gamma_l\right), \lambda_i^{ER}\right\}, \tag{24}$$

where $\hat{\lambda}_l^i$ denotes the last CCR value seen by a switch for a connection i at link 1 at the time $\rho_l$ is estimated.

It is also necessary to control queue growth for preventing a potential cell loss. If a queue length reaches a Low-Threshold ($Q_{LT}$) and the load factor $\rho_l$>1 (i.e., input rate is larger than the available capacity), the explicit rate assignment operation as defined by Equation (24) is turned off, and the explicit rate assignment as defined by Equation (19) is used. This ensures that whenever a potential congestion situation is detected, even if some sessions are idle, the non-idle sessions are not given any extra bandwidth, and the queues are allowed to drain. Furthermore, if a queue length is above a High-Threshold $Q_{HT}$ (indicating heavy congestion), the target utilization factor $\mu_{TARGET}$ is reduced by a Target Rate Reduction Factor (TRRF), until the queue length drops below the low threshold $Q_{LT}$. The Congestion Detection and Buffer Management module allows the queue to drain and operate at a desired queue level whenever the switch is heavily congested, which may occur, for example, when new connections are opened.

Use of the CCR field of an RM cell also ensures that the FMMRA algorithm of the present invention is interoperable in an environment consisting of simple EFCI switches or switches employing a different ER algorithm. A similar approach is taken by Jain et al., "The OSU Scheme for Congestion Avoidance using Explicit Rate Indication," tech. rep., Ohio State University, September 1994. However, the ERICA algorithm does not use the bottleneck status of the session, and the load factor is used regardless of the queue length. Accordingly, the $Q_{LT}$, $Q_{HT}$, and TRRF can be set as a function of round-trip delays in the network.

Figure 2:
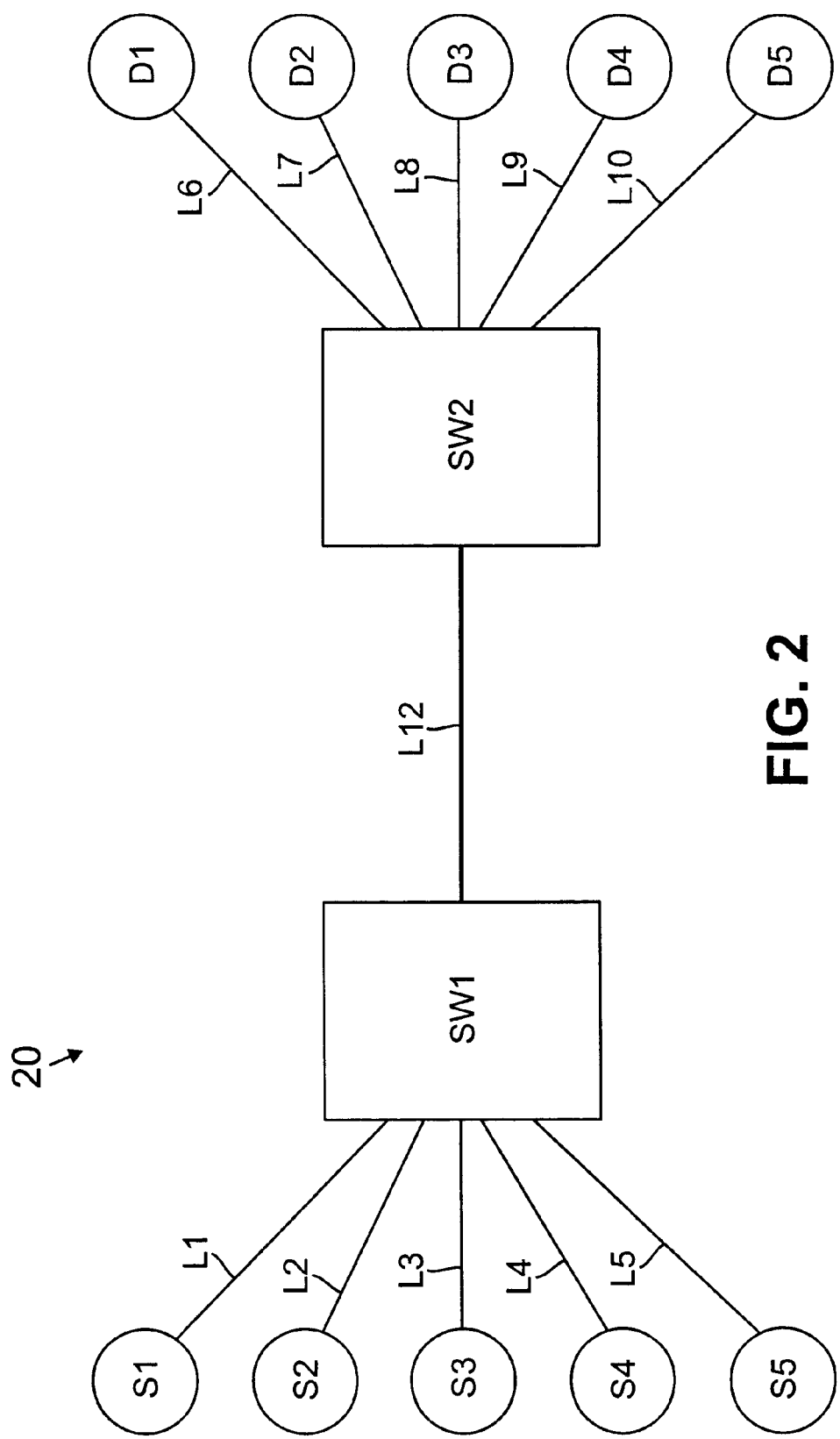
FIG. 2 shows an exemplary network topology for illustrating the ABR congestion scheme of the present invention in comparison to other conventional approaches.

FIG. 2 shows an exemplary network topology 20 that is used for illustrating the advantages of the present invention in comparison to the EPRCA and ERICA switch algorithms. Network 20 includes five sessions S1, S2, S3, S4 and S5, two ATM switches SW1 and SW2, and destinations D1, D2, D3, D4 and D5. Sessions S1, S2, S3, S4 and S5 are each connected to switch SW1 through links L1, L2, L3, L4 and L5, respectively. Switch SW1 is connected to switch SW2 through link L12. Switch SW2 is connected to each of destinations D1, D2, D3, D4 and D5 through links L6, L7, L8, L9 and L10, respectively. For performance measurement purposes, switches SW1 and SW2 are non-blocking and output buffered. Sources S1–S5 are well-behaved, persistently greedy, and always transmit at the maximum allowed cell rate. Persistent sources cause congested links and congested links present a tough challenge for testing performance of an ABR congestion control scheme. For all simulations described below, the ATM switch buffer size is characterized for achieving zero cell loss. Network 20 can be used for comparing performance of various algorithms in both a Local Area Network (LAN) configuration and a Wide Area Network (WAN) configuration. For a LAN configuration, all links are 1 km in length. In a WAN configuration, the distances of links L1–L2 and L6–L10 are 1000 km. The distance of link L12 is 100 km. In both the LAN and WAN configurations, all links have 100 Mbps capacity and have a propagation delay of 5 µs per km.

Figure 6A:
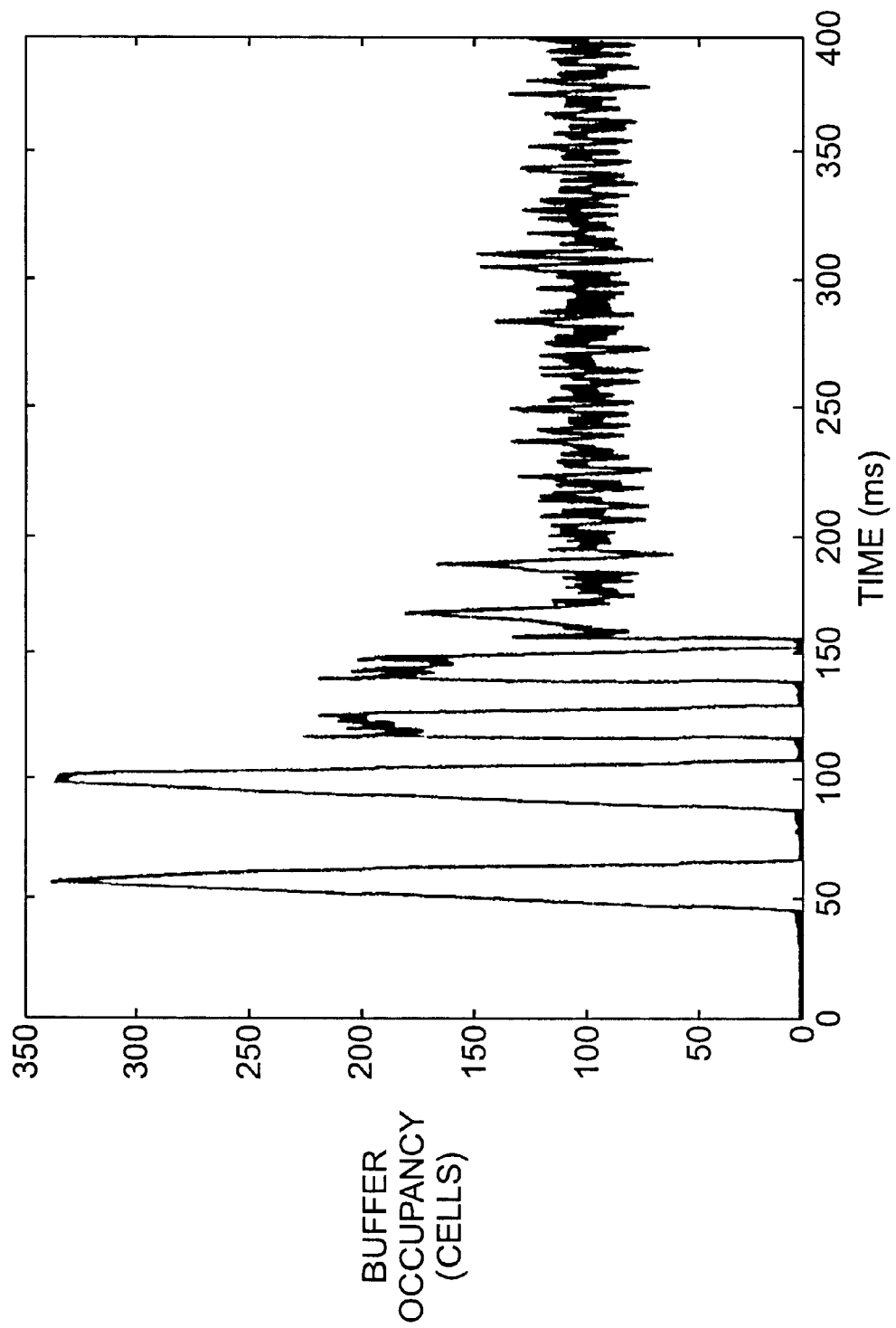
FIG. 6(a) shows instantaneous queue length for a single-hop WAN configuration (RIF=0.1) for the EPRCA approach.
Figure 6B:
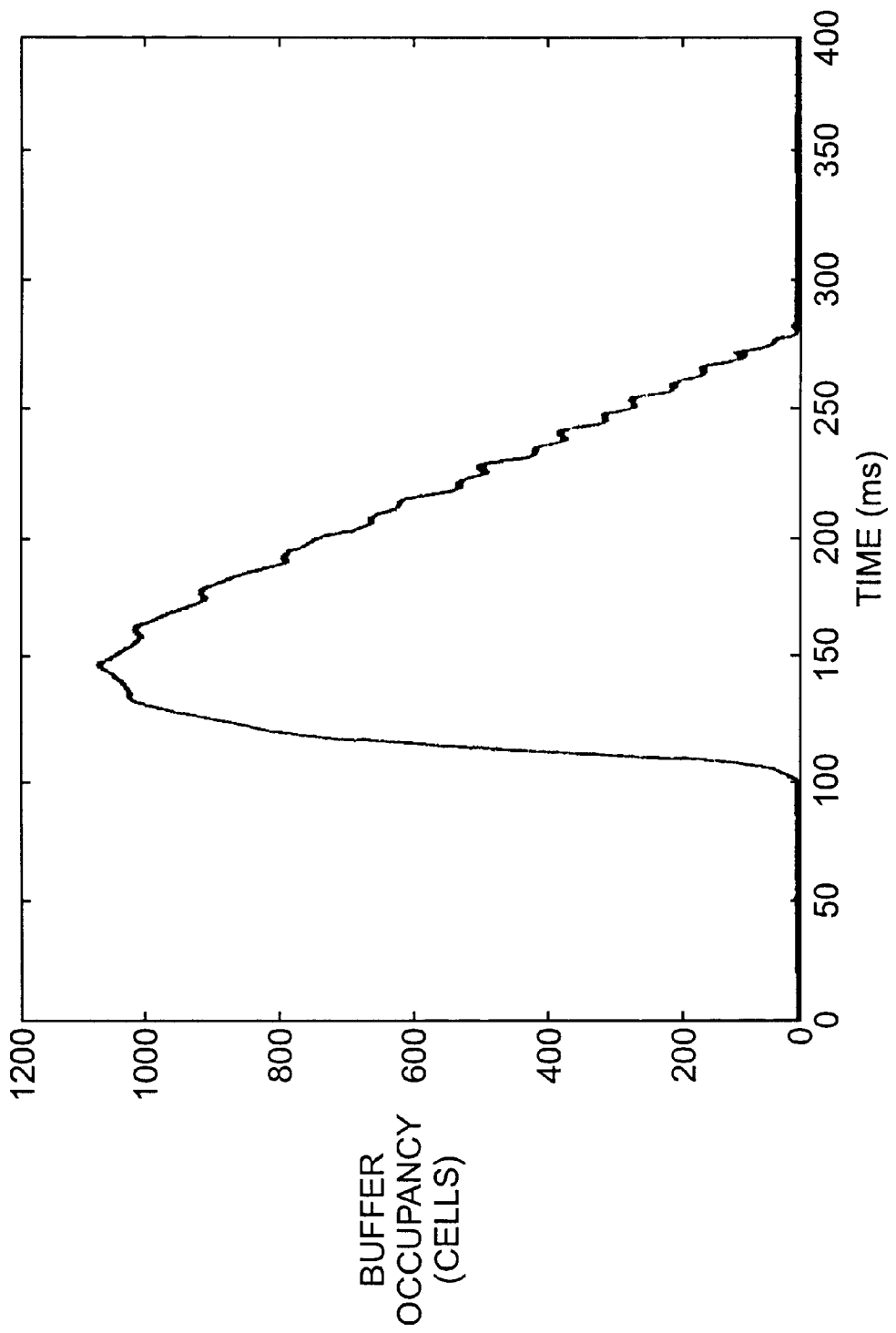
FIG. 6(b) shows instantaneous queue length for a single-hop WAN configuration (RIF=0.1) for the ERICA approach.

In the following simulations, sessions S1, S2 and S3 are selected to be initially transmitting at t=0. Sessions S4 and S5 begin transmitting at t=100 ms. Sessions 1 and 3 are chosen to be bottlenecked by setting the PCR value of sources S1 and S2 to 5 Mbps. Recall that a bottlenecked connection is a connection that cannot increase its transmission rate due to certain network conditions or lack of network resources. An AIR=0.1 Mbps value is used, meaning that non-bottlenecked sources may increase their allowed cell rate by 3.2 Mbps every time an RM cell arrives at the source. Session 2 can use 90 Mbps on link L12 until t=100 ms. At any time t>100 ms, sessions 2, 4 and 5 should receive equal share of bandwidth on link L12. Thus, the steady state (t>100 ms) bandwidth share for sessions 1 and 3 is 5 Mbps, and for sessions 2, 4 and 5 is 30 Mbps. The instantaneous bandwidth for each connection, and the total link utilization of link L12 for the EPRCA algorithm, the ERICA algorithm and the present invention in the LAN configuration are plotted in FIGS. 3(a)–3(d). The instantaneous bandwidth for each connection, and the total link utilization of link L12 for the EPRCA algorithm, the ERICA algorithm and the present invention in the WAN configuration are plotted in FIGS. 4(a)–4(d). FIGS. 5(a)–5(d) show instantaneous queue length for single hop for the different algorithms in the LAN configuration. FIGS. 6(a)–6(b) show instantaneous queue length in switch SW1 for the respective algorithms in the WAN configuration.

In FIGS. 3 and 4, the instantaneous bandwidth utilization measured in Mbps for sessions S1, S2, S3, S4 and S5 are shown by curves 31, 32, 33, 34 and 35 respectively. Although the EPRCA algorithm converges to fair rates, as shown in FIGS. 3(a) and 4(a), significant levels of oscillations are found at steady state, especially in the WAN configuration (FIG. 4(a)). The sessions receiving a higher bandwidth rate have larger oscillations than the sessions receiving lower bandwidth rates. While an AIR=0.1 Mbps value is used allowing sources to increase the allowed cell rate by 3.2 Mbps every time an RM cell arrives at the source, it is desired in a LAN to allow sources to increase their rates to their fair share almost instantaneously by using a higher value of AIR that can increase ACR up to PCR or ER instantly. Using a higher value of AIR with the EPRCA algorithm (FIG. 3(a)), results in poor convergence, large rate oscillations and poor link utilization. Moreover, the selection of threshold values is also important for achieving good performance. Improper selection of threshold values results in poor link utilization, especially in a WAN configuration (FIG. 4(a)). Thus, the EPRCA algorithm significantly limits the network to operate aggressively, that is, use of a high AIR value, and to be robust, that is, selection of parameters.

Figure 3A:
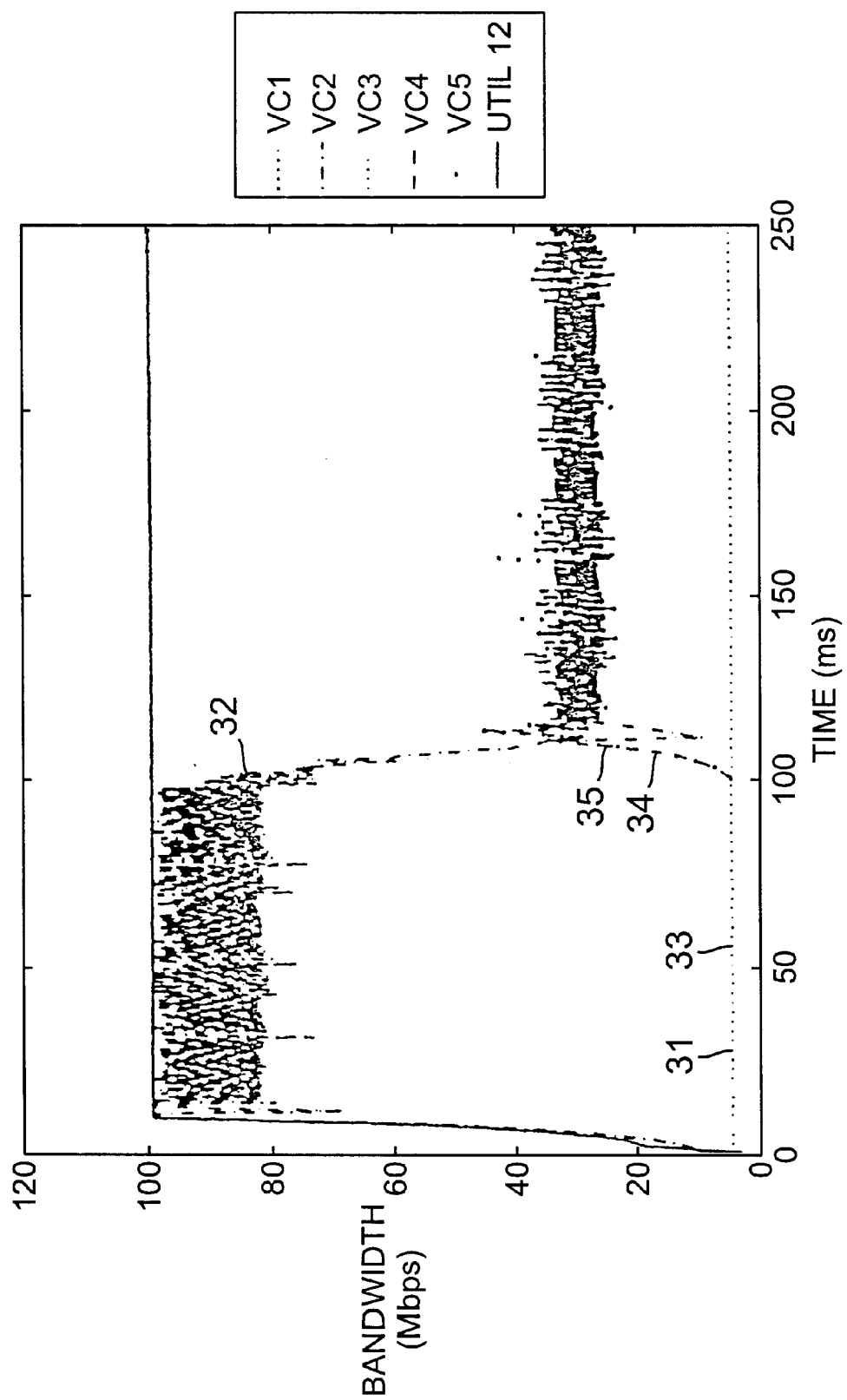
FIG. 3(a) shows instantaneous bandwidth utilization for a single-hop bottleneck LAN configuration (RIF=0.1) for the EPRCA approach.
Figure 3B:
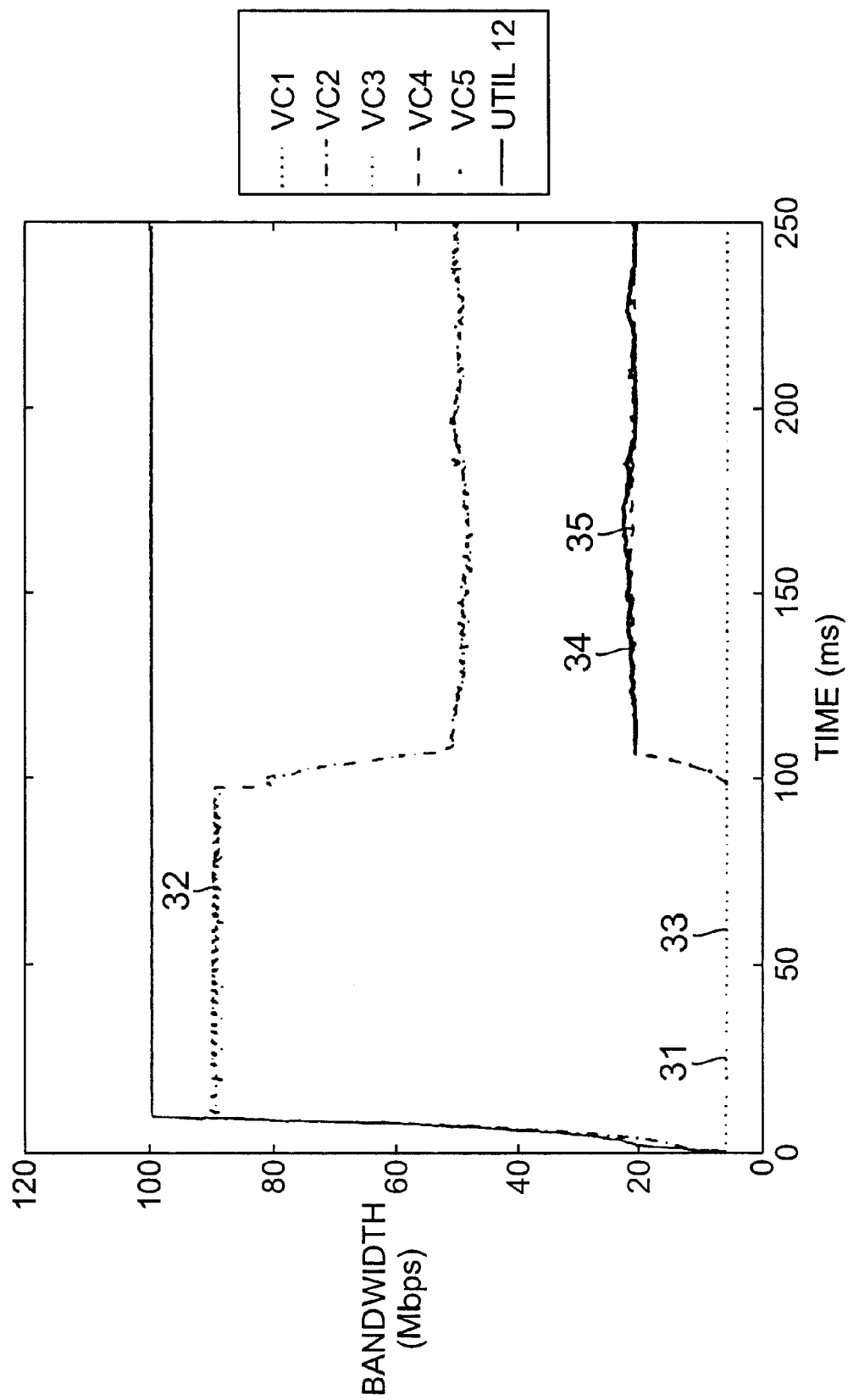
FIG. 3(b) shows instantaneous bandwidth utilization for a single-hop bottleneck LAN configuration (RIF=0.1) for the ERICA approach.
Figure 4A:
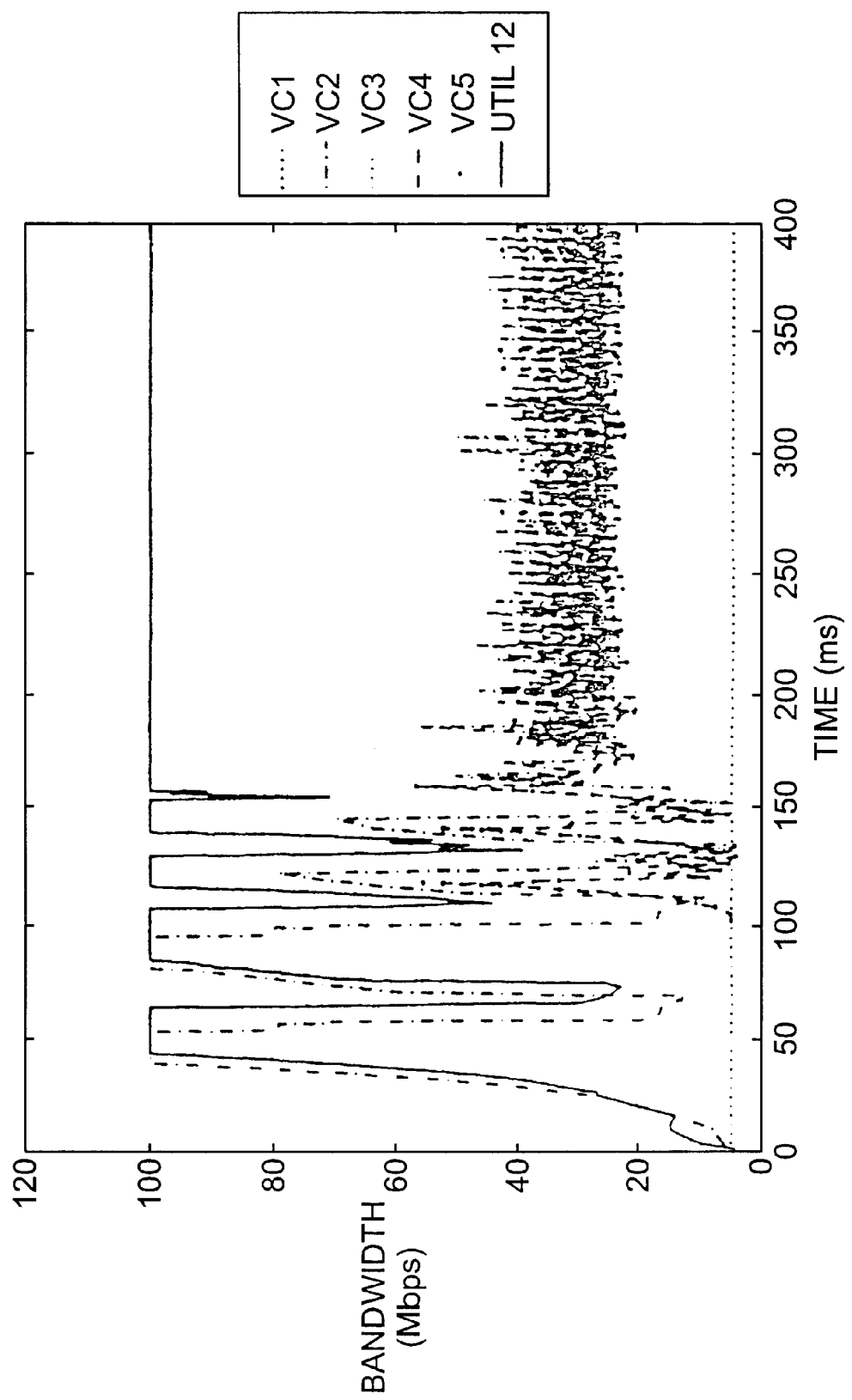
FIG. 4(a) shows instantaneous bandwidth utilization for a single-hop bottleneck WAN configuration (RIF=0.1) for the EPRCA approach.
Figure 4B:
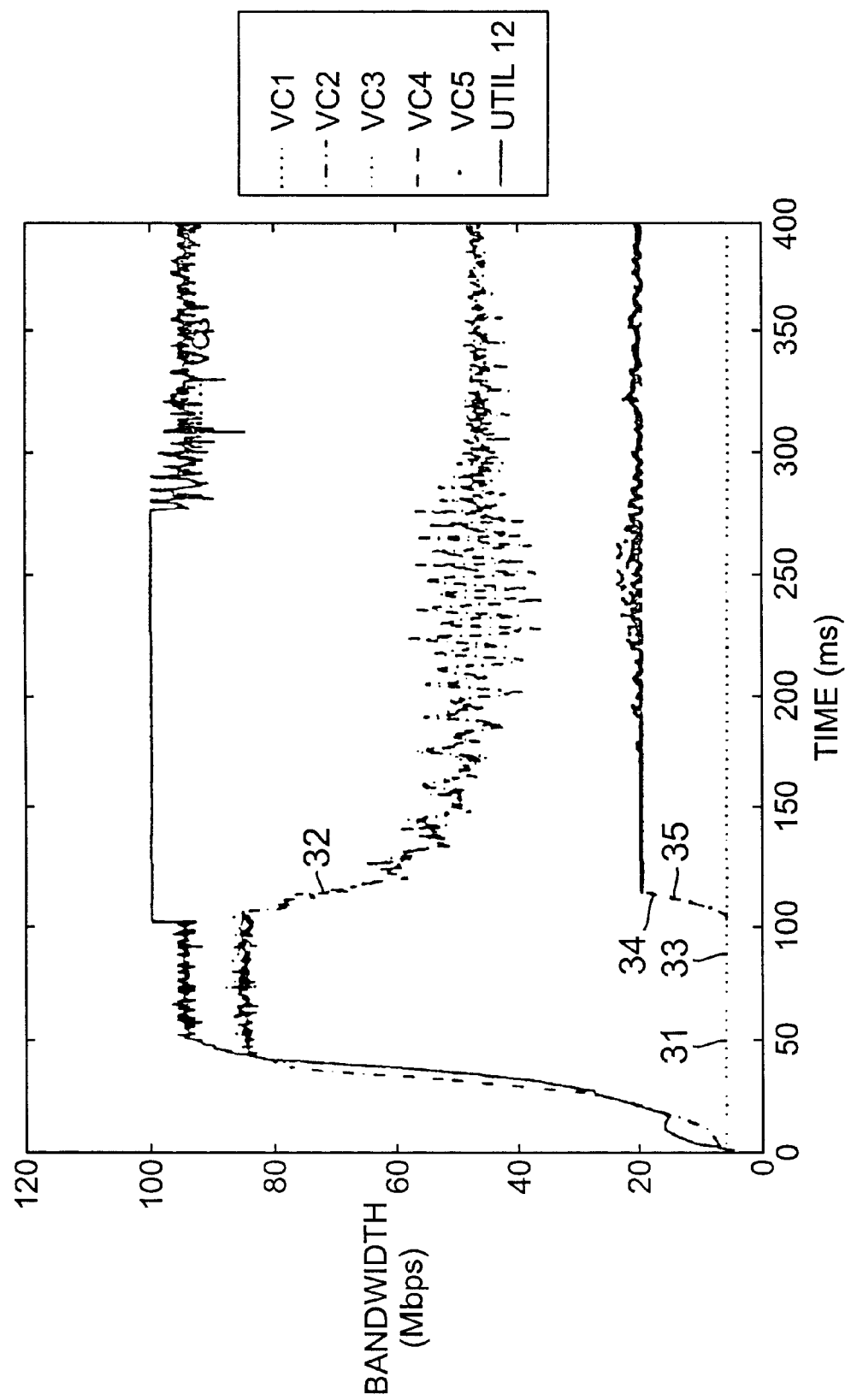
FIG. 4(b) shows instantaneous bandwidth utilization for a single-hop bottleneck WAN configuration (RIF=0.1) for the ERICA approach.

In FIGS. 3(b) and 4(b), the ERICA algorithm fails to converge to the fair rates for both LAN and WAN environments. Sessions that start late do not receive their fair share of 30 Mbps. Instead, the late starting session receive a share of 20 Mbps, because the ERICA algorithm does not calculate the exact fair rate. Furthermore, queue levels grow without bound (FIGS. 5(b) and 6(b)), and it is necessary to set the desired target utilization below 100% for avoiding such a large growth. Even using a lower target utilization factor (95%) in the WAN configuration results in high peak queue length, as illustrated in FIG. 6(b).

Figure 3C:
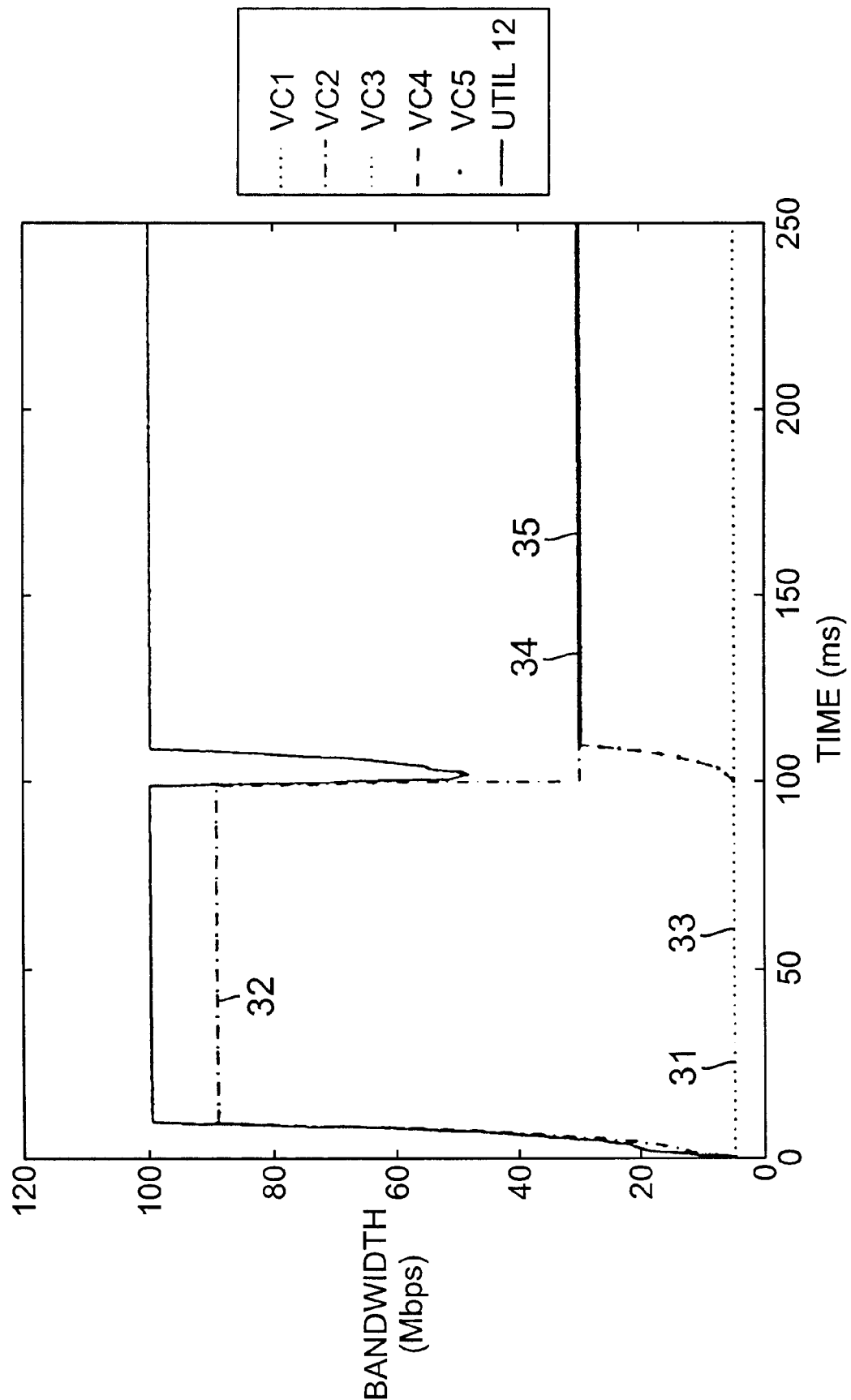
FIG. 3(c) shows instantaneous bandwidth utilization for a single-hop bottleneck LAN configuration (RIF=0.1) for the FMMRA scheme of the present invention having no buffer control.
Figure 3D:
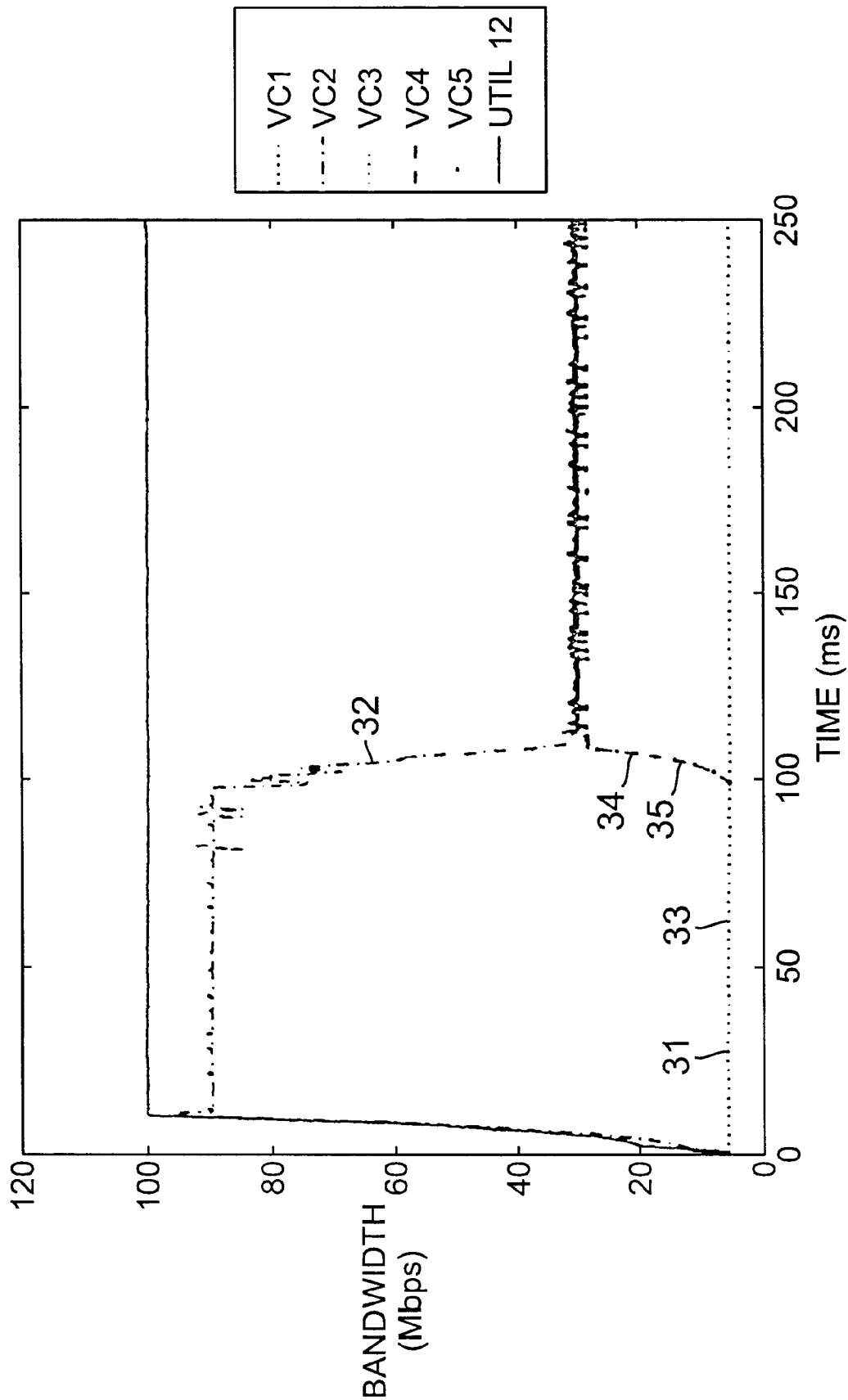
FIG. 3(d) shows instantaneous bandwidth utilization for a single-hop bottleneck LAN configuration (RIF=0.1) for the FMMRA scheme of the present invention having buffer control.
Figure 4C:
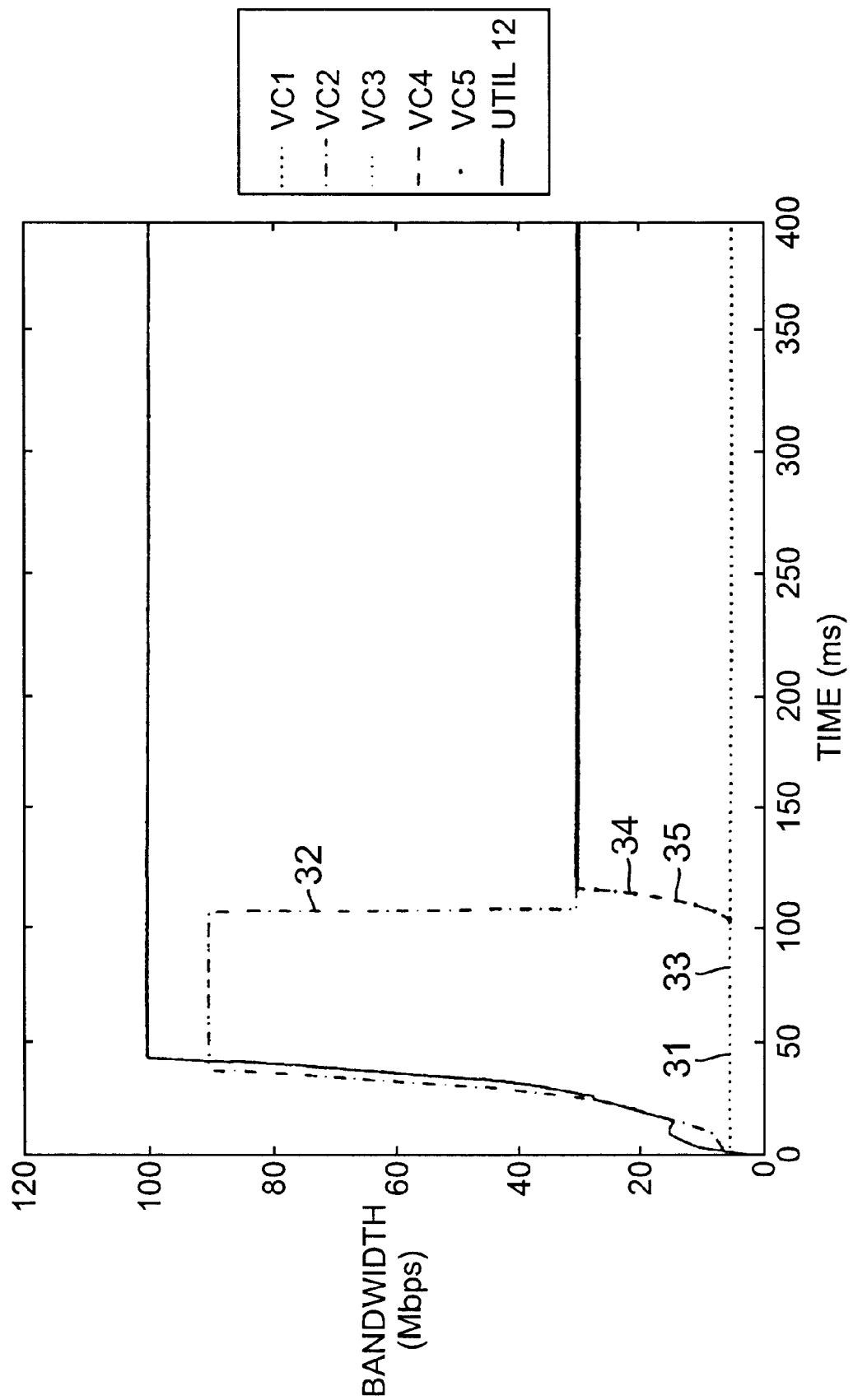
FIG. 4(c) shows instantaneous bandwidth utilization for a single-hop bottleneck WAN configuration (RIF=0.1) for the FMMRA scheme of the present invention having no buffer control.
Figure 4D:
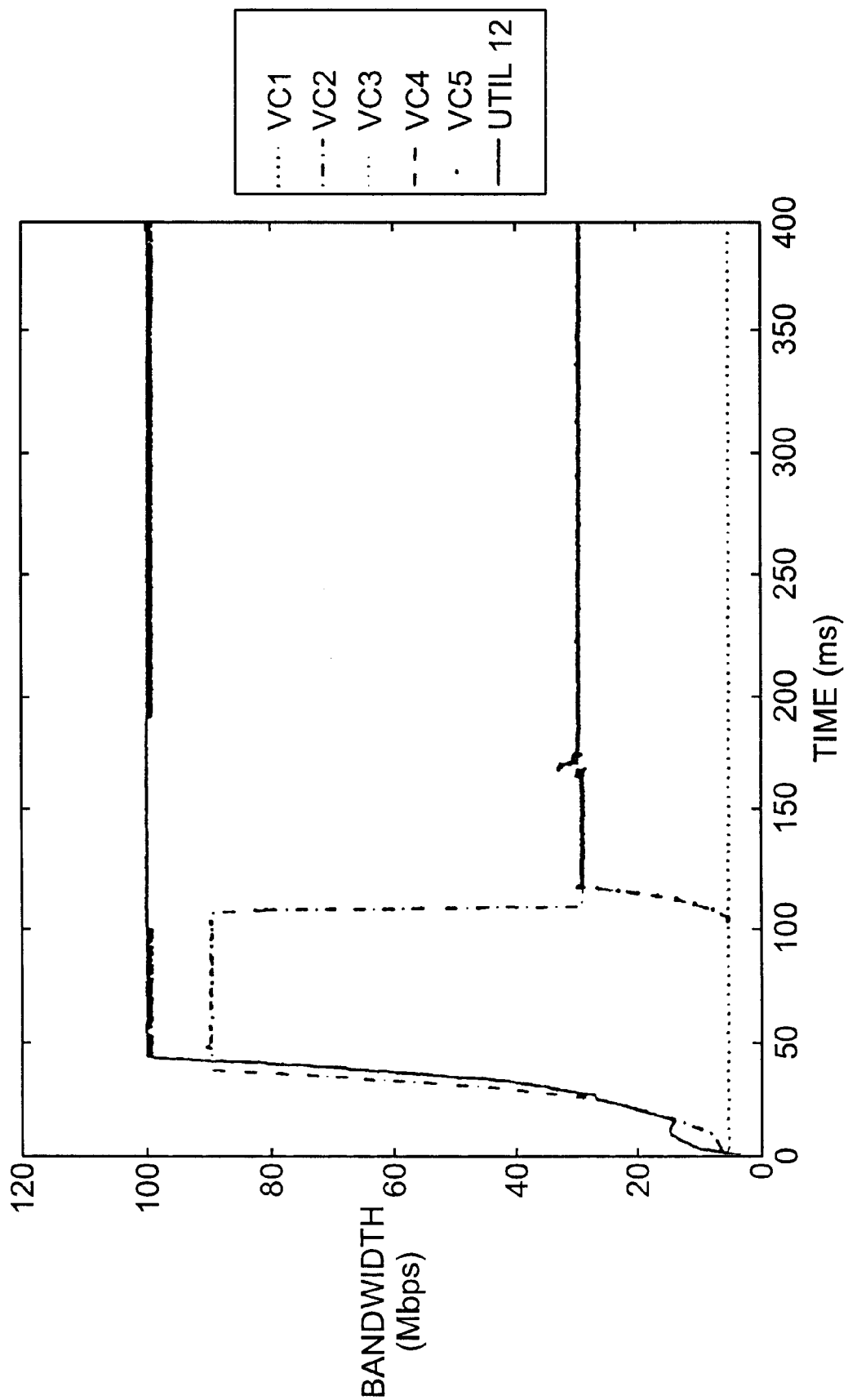
FIG. 4(d) shows instantaneous bandwidth utilization for a single-hop bottleneck WAN configuration (RIF=0.1) for the FMMRA scheme of the present invention having buffer control.
Figure 5A:
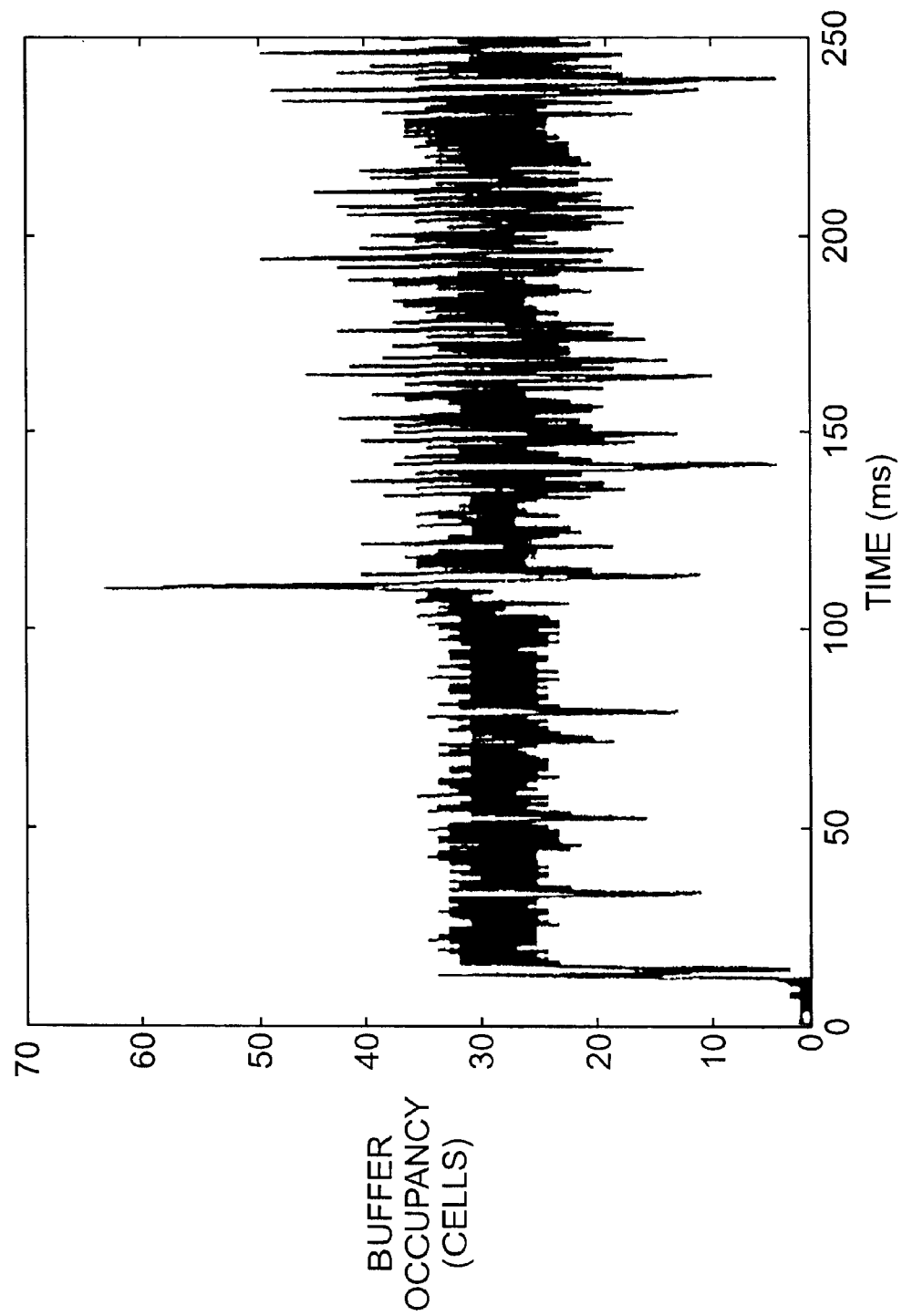
FIG. 5(a) shows instantaneous queue length for a single-hop LAN configuration (RIF=0.1) for the EPRCA approach.
Figure 5B:
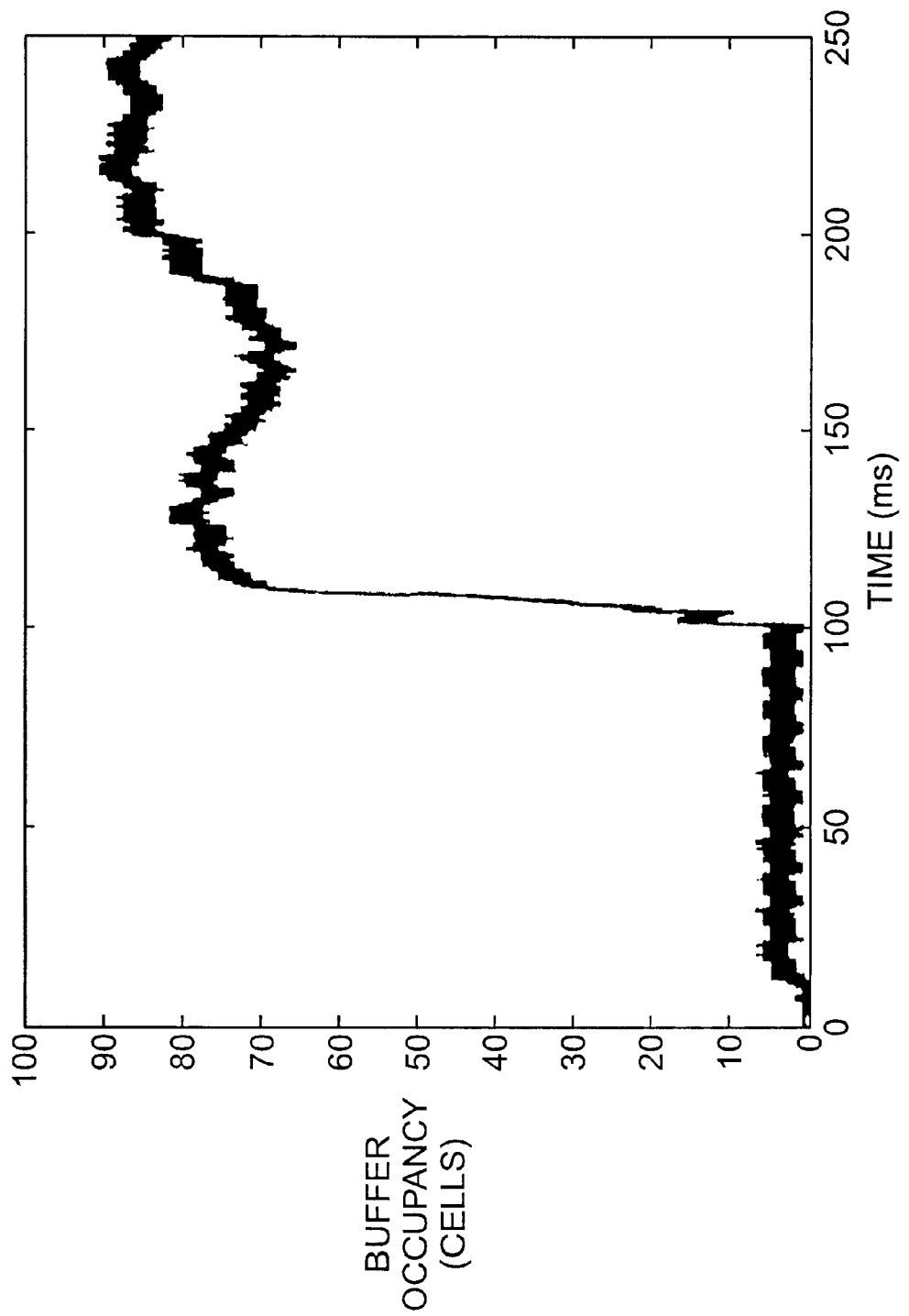
FIG. 5(b) shows instantaneous queue length for a single-hop LAN configuration (RIF=0.1) for the ERICA approach.
Figure 5D:
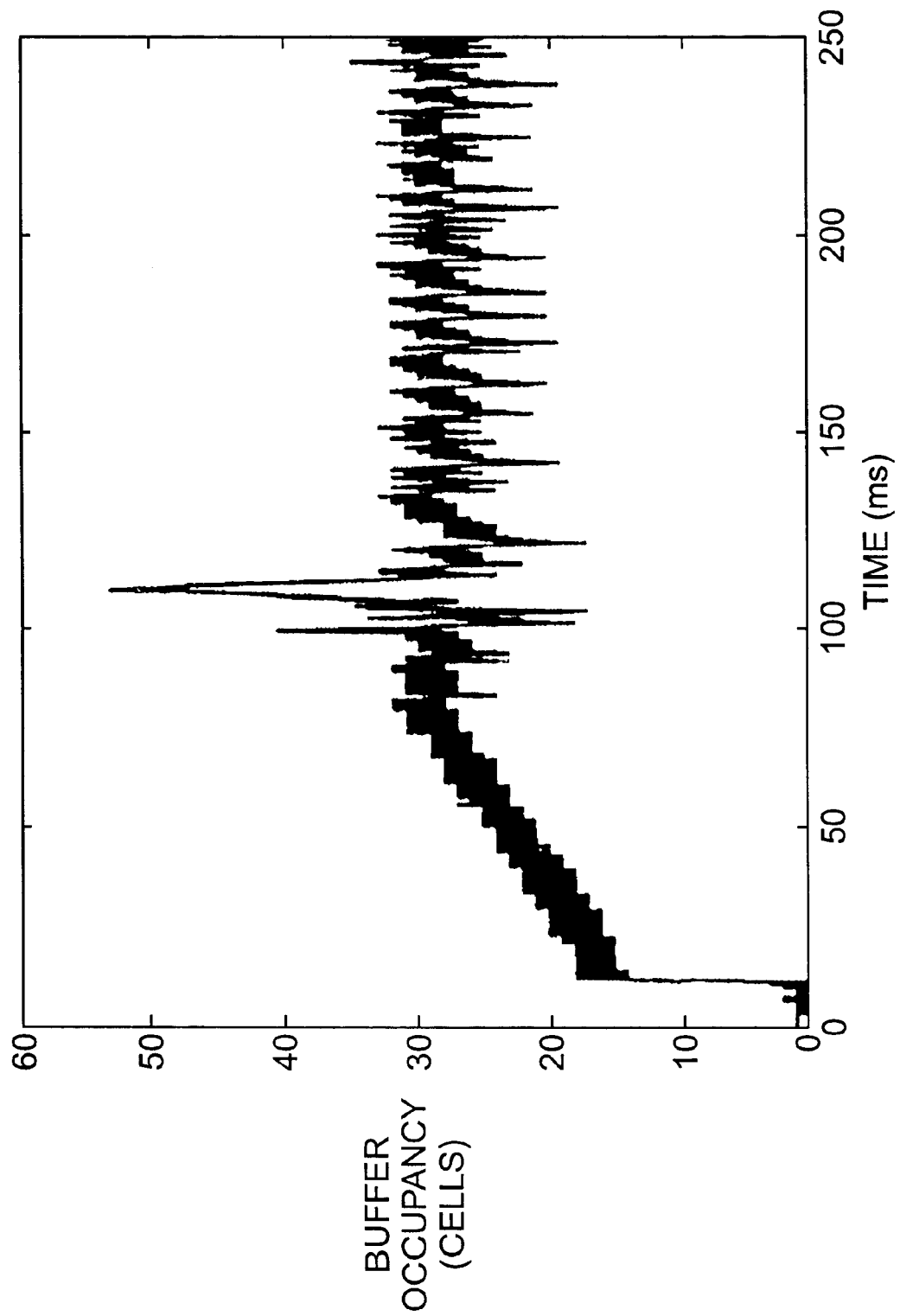
FIG. 5(d) shows instantaneous queue length for a single-hop LAN configuration (RIF=0.1) for the FMMRA scheme of the present invention having buffer control.
Figure 6C:
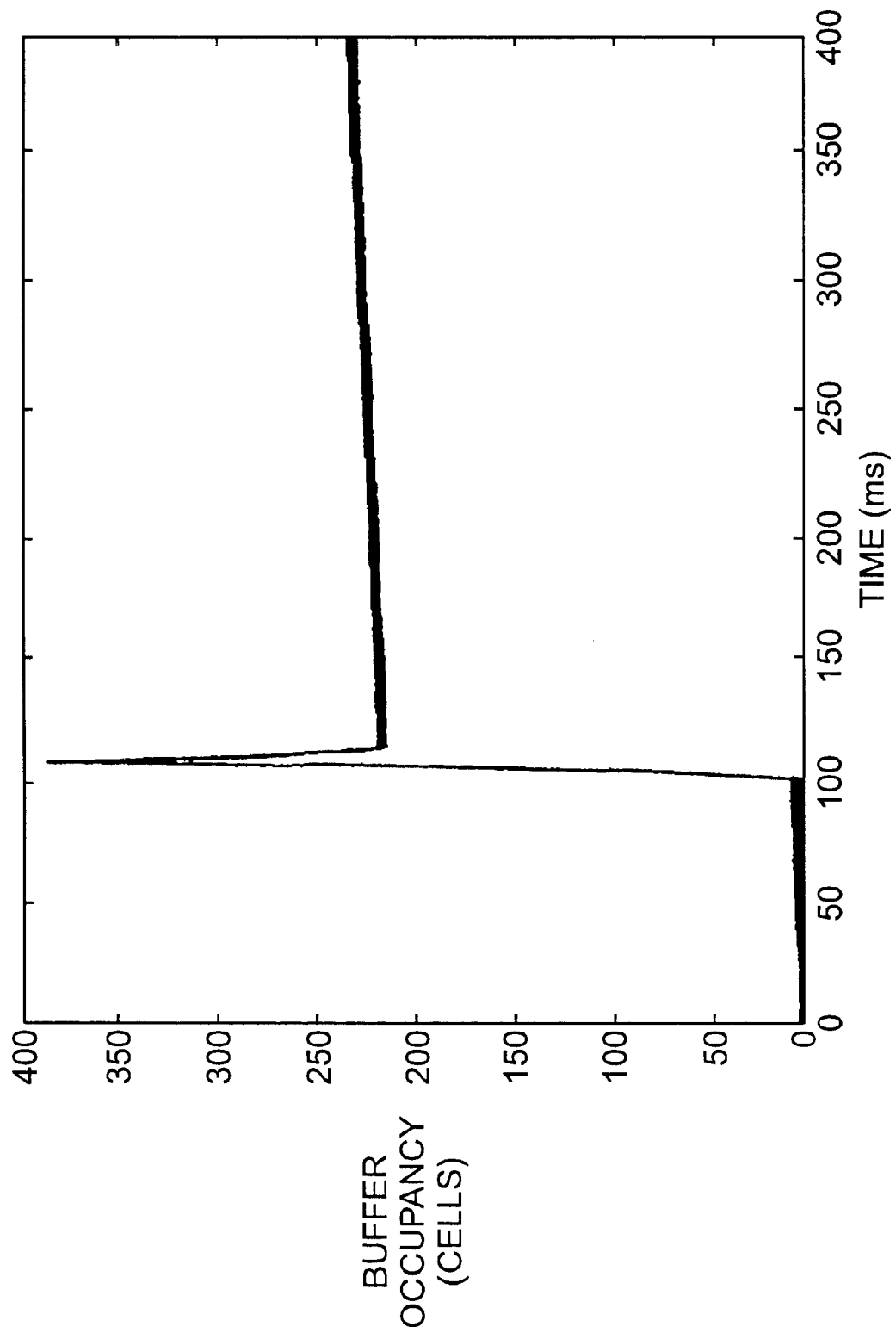
FIG. 6(c) shows instantaneous queue length for a single-hop WAN configuration (RIF=0.1) for the FMMRA scheme of the present invention having no buffer control.
Figure 6D:
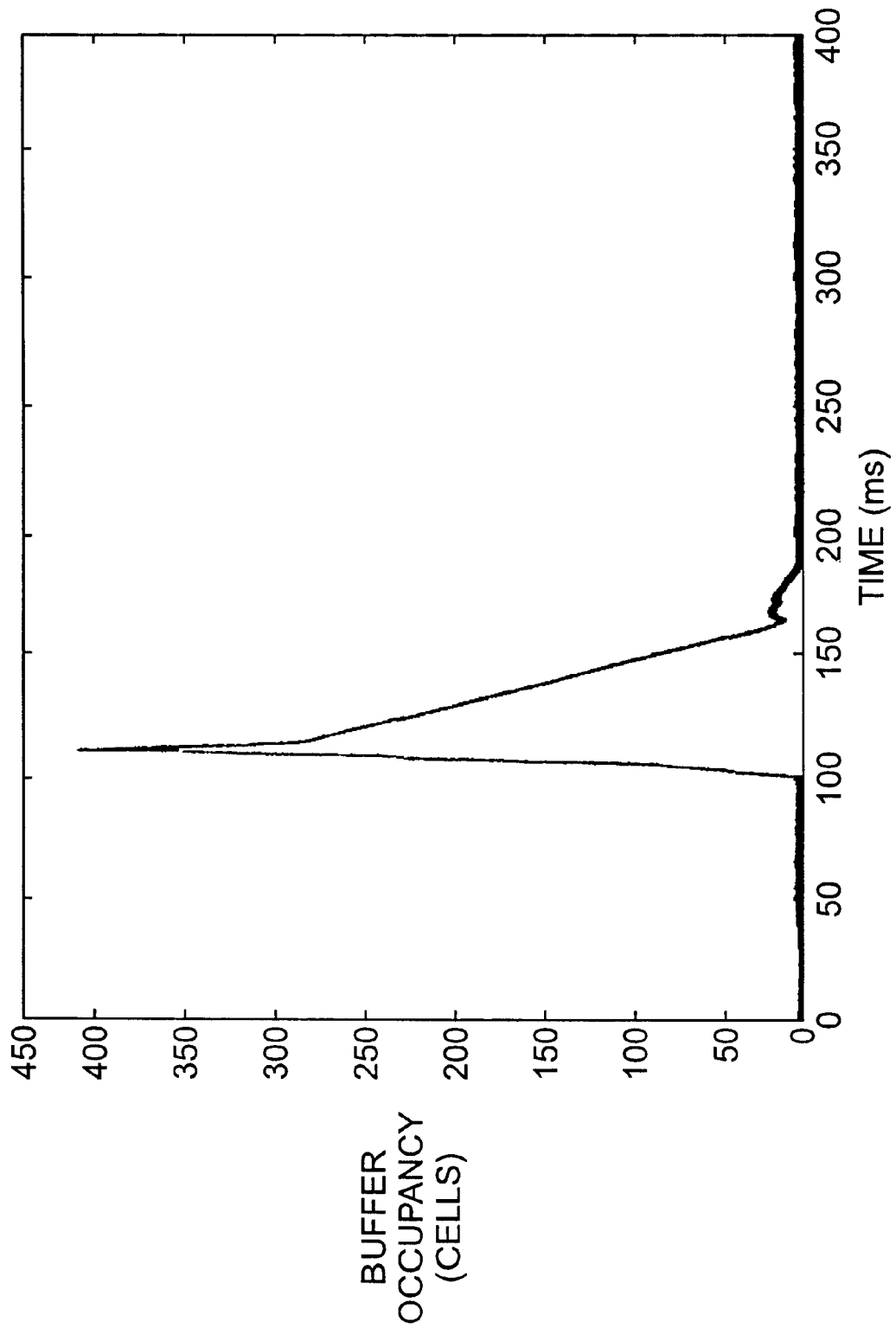
FIG. 6(d) shows instantaneous queue length for a single-hop WAN configuration (RIF=0.1) for the FMMRA scheme of the present invention having buffer control.

Both the present invention with and without buffer control results in an oscillation-free steady state, as shown by FIGS. 3(c) and 4(c) (without buffer control) and FIGS. 3(d) and 4(d) (with buffer control). In the WAN configuration, the present invention provides a significant improvement in convergence time over the EPRCA. An advantage of using buffer control is seen for the WAN configuration model, whereas present invention without buffer control (FIG. 6(c)) results in a steady-state queue length of about 240 cells. On the other hand the FMMRA algorithm with buffer control (FIG. 6(d)) provides a steady-state queue length of about 30 cells. The present invention converges to the correct fair rates without any oscillations regardless of the AIR used. In fact, using a high AIR value results in a much faster convergence time.

Table I below sets for pseudocode for the ABR congestion control scheme of the present invention.

TABLE I

| | |
|---|---|
| Input: | RM cell from connection i |
| Output: | Marking of RM cell fields of connection i |
| Queue Variables: | |
| ADV_RATE: | Current advertised rate of the ABR queue |
| ABR BW: | Current available bandwidth for ABR connections |
| ABR_VCs: | Current Total Number of VCs using the ABR queue |
| ABR_BNK_BW: | Current total bottleneck bandwidth |
| BNK_VCs: | Current total number of connections bottlenecked elsewhere |

TABLE I-continued

| | |
|---|---|
| NON_BNK_VCs: | Current total number of connections not bottlenecked elsewhere |
| ABR_LF: | Current bandwidth utilization (Load Factor) of ABR connections |
| ER_MAX: | Current maximum stamped ER in backward RM cell |
| ER_ADJST: | Current Adjusted ER based on Load Factor |
| Tuned Parameters: | |
| Alpha: | Averaging Factor to update ER_MAX (Typically ⅛) |
| Q_LT: | Low queue threshold (Typically 50 cells) |
| Q_HT: | High queue threshold (Typical 1000 cells) |
| LF_MIN: | Lower limit on Load Factor (Typically 0.8) |
| LF_MAX: | Upper limit on Load Factor (Typically 1.2) |
| Per-VC Variables: | |
| BNK_STATE(i); | Bottleneck state of connection i |
| BNK_BW(i): | Bottleneck bandwidth of connection i |
| RM-Cell Fields: | |
| DIR: | Direction of RM cell (Forward or Backward) |
| ER: | Explicit Rate |

```
if(Forward RM cell is received)                      /* Forward RM cell
  i=get_VCI(RM)                                      /* Obtain the Connection Identifier
/* The ABR_LF reflects the bandwidth utilization by ABR connections. ABR_LF < 1
reflects that the bandwidth is not utilized fully. So, the Bandwidth Allocation can be
increased for non-bottlenecked connections. ABR_LR > 1 means that the bandwidth has
been over allocated and the allocations require reduction. */
/* To avoid sudden changes in Load and for making smooth transitions, the Load Factor
is limited to be between two values, LF_MIN and LF_MAX. */
  ABR_LF=min(ABR_LF,LF_MAX)                          /* Limit Upper bound on Load
                                                        Factor
  ABR_LF=max(ABR_LF,LF_MIN)                          /* Limit Lower bound on Load
                                                        Factor
  ER_ADJST=ER_MAX/ABR_LF                             /* Adjust the ER_MAX by Load
                                                        Factor
/* If a connection is already bottlenecked elsewhere, there is no need to provide any
additional bandwidth. */
  if(BNK_STATE(i)=0)                                 /* Connection is not bottlenecked
    ER=min(ER,max(ADV_RATE,ER_ADJST)                 /* Stamp ER in the RM cell
  else
    ER=min(ER,ADV_RATE)
if(Backward RM cell is received)                     /* Backward RM cell
    i=get_VCI(RM)                                    /* Obtain the Connection Identifier
/* The ABR_LF reflects the bandwidth utilization by ABR connections. ABR_LF < 1
reflects that the bandwidth is not utilized fully. So, the Bandwidth Allocation can be
increased for non-bottlenecked connections. ABR_LR > 1 means that the bandwidth has
been over allocated and the allocations require reduction. */
/* To avoid sudden changes in Load and for making smooth transitions, the Load Factor
is limited to be between two values, LF_MIN and LF_MAX. */
  ABR_LF=min(ABR_LF,LF_MAX)                          /* Limit Upper bound on Load
                                                        Factor
  ABR_LF=max(ABR_LF,LF_MIN)                          /* Limit Lower bound on Load
                                                        Factor
  ER_ADJST=ER_MAX/ABR_LF                             /* Adjust the ER_MAX by Load
                                                        Factor
/* The ER needs to be stamped based on the level of congestion at the switch. If the
switch is not congested, the algorithm of the present invention can be more aggressive.
On the other hand, when the switch is severely congested, the algorithm of the present
invention needs to be conservative. Two queue thresholds, along with ABR_LF, are used
for determining the level of congestion (i.e., Q_LT and Q-HT). */
/* ER_MAX below is a running average of maximum ER value stamped in the backward
direction. The quantity functions as a common reference point for all VCs. It becomes
useful when some connections are not active all the time. This presents the opportunity
for the connection to send cells at a rate greater than the advertised rate. */
if(Queue Length<Q_LT)                                /* Queue length is below low
                                                        threshold
  if(BNK_State(i)=0)                                 /* Connection is not bottlenecked
    ER=min(ER,max(ADV_RATE,ER_ADJST))                /* Stamp ER in the RM cell
  else                                               /* Connection is bottlenecked
    ER=min(ER,ADV_RATE)                              /* Stamp ER in the RM cell
if(Queue Length>Q_LT and Queue Length<Q_HT)          /* Queue length is between
                                                        thresholds
  if(ABR_LF>1)                                       /* Load factor is greater than 1
```

TABLE I-continued

```
if(BNK_STATE(i)=0)                                    /* Connection is not bottlenecked
  ER=min(ER,max(ADV_RATE,ER_ADJST))                   /* Stamp ER in the RM cell
else                                                  /* Connection is bottlenecked
  ER=min(Er,ADV_RATE)                                 /* Stamp ER in the RM cell
else                                                  /* Load factor is less than 1
  if(BNK_STATE(i)=0)                                  /* Connection is not bottlenecked
    ER=min(ER,max(ADV_RATE,ER_MAX))                   /* Stamp ER in the RM cell
  else                                                /* Connection is bottlenecked
    ER=min(ER,ADV_RATE)                               /* Stamp ER in the RM cell
/* If the queue is greater than upper threshold, take conservative measures. Do not allow
rate adjustments based on load adjustments */
if(Queue Length>Q_HT)                                 /* Queue length is greater than
                                                         upper threshold
  ER=min(ER,ADV_RATE)                                 /* Stamp ER in the RM cell
ER_MAX=(1-Alpha)*ER_MAX+Alpha*max(ER,ER_ADJST)        /* Update ER_MAX
/* Advertised Rate Calculation Routine */
If(ADV_RATE>ER)                                       /* Connection is bottlenecked
  BNK_VCs=BNK_VCs-BNK_STATE(i)+1                      /* Update Bottleneck VC count
  BNK_STATE(i)=1                                      /* Set connection as bottlenecked
  ABR_BNK_BW=ABR_BNK_BW+ER-BNK_BW(i)                  /* Update bottleneck
                                                         bandwidth
  BNK_BW(i)=ER                                        /* Store bottleneck bandwidth for
                                                         VC
else                                                  /* Connection not bottlenecked
  BNK_VCs=BNK_VCs-BNK_STATE(i)                        /* Update Bottlenecked VC count
  BNK_BW(i)=0                                         /* Set connection as not
                                                         bottlenecked
  ABR_BNK_BW=ABR_BNK_BW-BNK_BW(i)                     /* Update bottleneck bandwidth
  BNK_BW(i)=0.0                                       /* Reset bottleneck bandwidth for
                                                         VC
NON_BNK_VCs=ABR_VCs-BNK_VCs                           /* Compute non-bottlenecked VCs
if(NON_BNK_VCs=0)                                     /* All connections are bottlenecked
  ADV_RATE=ADV_RATE                                   /* Keep the same advertised rate
else                                                  /* There are no bottlenecked VCs
  ADV_RATE=(ABR_BW-ABR_BNK_BW)/NON_BNK_VCs            /* Update Advertised Rate
```

While the present invention has been described in connection with the illustrated embodiments, it will be appreciated and understood that modifications may be made without departing from the true spirit and scope of the invention.

What is claimed is:

1. A method for allocating a fair bit rate for an ABR service, comprising the steps of: receiving forward and backward RM cells traversing a link 1, the forward and backward RM cells being associated with a session, the forward RM cells being transmitted from a source to a destination and the backward RM cells being transmitted from the destination to the source; and updating an advertised rate $\gamma_l$ for link 1 when a backward RM cell associated with the session is received based on a change in a bottleneck bandwidth $\Delta\lambda$ of the session and a change in a bottleneck status $\Delta\beta$ of the session.

2. The method according to claim 1, wherein the step of updating the advertised rate $\gamma_l$ includes the steps of:

comparing an explicit rate $\lambda^{ER}$ contained in the backward RM cell to the advertised rate $\gamma_l$;

setting a bottleneck indicator $\beta$ for the session when the explicit rate $\lambda^{ER}$ is less than the advertised rate $\gamma_l$;

setting a bottleneck bandwidth $\lambda$ for the session when the explicit rate $\lambda^{ER}$ is less than the advertised rate $\gamma_l$;

clearing the bottleneck indicator $\beta$ for the session when the explicit rate $\lambda^{ER}$ is greater than or equal to the advertised rate $\gamma_l$;

clearing the bottleneck bandwidth $\lambda$ for the session when the explicit rate $\lambda^{ER}$ is greater than or equal to the advertised rate $\gamma_l$;

calculating a number of bottlenecked connections $\overline{N}_l(t^+)$ for the link after the backward RM cell is received;

calculating a bottlenecked bandwidth for bottlenecked connections $\overline{C}_l(t^+)$ for the link after the backward RM cell is received;

updating the advertised rate $\gamma_l$ based on a quantity difference between an available bandwidth $C_l^A(t)$ prior to receiving the backward RM cell and the bottlenecked bandwidth for bottlenecked connections $\overline{C}_l(t^+)$ after the backward RM cell is received, divided by a quantity difference between a number of bottlenecked connections $\overline{N}_l(t)$ prior to receiving the backward RM cell and the number of bottlenecked connections $\overline{N}_l(t^+)$ after the backward RM cell is received.

3. The method according to claim 2, further comprising the steps of:

rewriting the explicit rate $\lambda^{ER}$ contained in the backward RM cell as a minimum of the advertised rate $\gamma_l$ and the explicit rate $\lambda^{ER}$; and transmitting the backward RM cell to the source of the RM cell.

4. The method according to claim 3, further comprising the step of calculating the available bandwidth $C_l^A(t)$ for link 1 based on a difference between a link capacity bandwidth $C_l$ for link 1 and a bandwidth for guaranteed traffic $C_l^{GUR}$ for link 1.

5. The method according to claim 4, wherein the step of calculating the available bandwidth $C_l^A(t)$ for link 1 further includes the step of scaling the difference between the link capacity bandwidth $C_l$ and the bandwidth for guaranteed traffic $C_l^{GUR}$ by a bandwidth utilization factor $\mu_l$ for link 1.

6. The method according to claim 5, further comprising the steps of:

computing a load factor $\rho_l$ for link 1 based on an actual ABR traffic bandwidth $F_l$ for link 1 divided by the available bandwidth $C_l^A(t)$ for link 1; and increasing the explicit rate $\lambda^{ER}$ of non-bottlenecked sessions for link 1 based on the load factor $\rho_l$.

* * * * *